(12) United States Patent
Erden et al.

(10) Patent No.: US 7,724,844 B2
(45) Date of Patent: May 25, 2010

(54) DETECTION OF SERVO DATA FOR A SERVO SYSTEM

(75) Inventors: Mehmet F. Erden, Pittsburgh, PA (US); Richard L. Keizer, Minnetonka, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 664 days.

(21) Appl. No.: 11/700,340

(22) Filed: Jan. 31, 2007

(65) Prior Publication Data

US 2008/0180825 A1 Jul. 31, 2008

(51) Int. Cl.
*H04L 27/06* (2006.01)

(52) U.S. Cl. ........................................ 375/341; 375/343

(58) Field of Classification Search ................ 375/341, 375/343, 350, 233, 232
See application file for complete search history.

(56) References Cited

U.S. PATENT DOCUMENTS

| | | | | |
|---|---|---|---|---|
| 6,233,273 | B1 * | 5/2001 | Webster et al. | 375/148 |
| 6,243,224 | B1 | 6/2001 | Sacks et al. | 360/77.08 |
| 6,304,398 | B1 * | 10/2001 | Gaub et al. | 360/49 |
| 6,345,076 | B1 | 2/2002 | Petersen et al. | 375/341 |
| 6,426,845 | B1 | 7/2002 | Sacks et al. | 360/77.08 |
| 6,594,094 | B2 * | 7/2003 | Rae et al. | 360/25 |
| 6,738,205 | B1 | 5/2004 | Moran et al. | 360/17 |
| 7,110,202 | B1 * | 9/2006 | Vasquez | 360/51 |
| 2002/0150179 | A1 | 10/2002 | Leis et al. | 375/340 |
| 2002/0159350 | A1 * | 10/2002 | Ogura et al. | 369/47.35 |
| 2003/0095350 | A1 | 5/2003 | Annampedu et al. | 360/39 |
| 2003/0099052 | A1 | 5/2003 | Annampedu et al. | 360/39 |
| 2003/0197971 | A1 | 10/2003 | Lyle et al. | 360/78.04 |
| 2003/0210741 | A1 * | 11/2003 | Fimoff et al. | 375/232 |
| 2004/0196584 | A1 | 10/2004 | Wilson | 360/67 |
| 2005/0084028 | A1 * | 4/2005 | Yu et al. | 375/267 |
| 2005/0213652 | A1 * | 9/2005 | Higashino | 375/233 |
| 2006/0098719 | A1 * | 5/2006 | Baltersee et al. | 375/148 |
| 2007/0002983 | A1 * | 1/2007 | Steele et al. | 375/347 |
| 2007/0165707 | A1 * | 7/2007 | Margetts et al. | 375/150 |
| 2007/0258517 | A1 * | 11/2007 | Rollings et al. | 375/233 |
| 2008/0152053 | A1 * | 6/2008 | Fulghum et al. | 375/347 |
| 2009/0136219 | A1 * | 5/2009 | Kikugawa et al. | 386/126 |

OTHER PUBLICATIONS

Harry L. Van Trees; "Detection, Estimation, and Modulation Theory, Part I, Detection, Estimation, and Linear Modulation Theory"; Massachusetts Institute of Technology, 1968, 3 pages including p. 262.

\* cited by examiner

*Primary Examiner*—Emmanuel Bayard
(74) *Attorney, Agent, or Firm*—Westman, Champlin & Kelly, P.A.

(57) ABSTRACT

A servo system for detecting and demodulating servo data is disclosed. In illustrated aspects, a demodulation circuit or portion includes a correlator component configured to output a correlation of a sequence of equalized channel samples with a sequence of correlator weight derived based on at least one mapped channel sequence. A decision component, for example a threshold detector uses the correlation results to output a data bit symbol based upon the correlation of the sequence of equalized channel samples to the at least one mapped channel sequence.

20 Claims, 23 Drawing Sheets

| | CHANNEL SEQUENCE (8 SAMPLE LENGTH) | DATA BITS PAIRS |
|---|---|---|
| $C_1$ | -1 -1 -1 -1 1 1 1 1 | $b_1$  0 0 |
| $C_2$ | -1 -1 1 1 1 1 -1 -1 | $b_2$  0 1 |
| $C_3$ | 1 1 -1 -1 -1 -1 1 1 | $b_3$  1 0 |
| $C_4$ | 1 1 1 1 -1 -1 -1 -1 | $b_4$  1 1 |
| PLL | 1 1 -1 -1 1 1 1 -1 -1 | X X |

Figure 6

| | CHANNEL SEQUENCE (8 SAMPLE LENGTH) $\overset{190}{\sim}$ | DATA BIT PAIRS $\overset{192}{\sim}$ | |
|---|---|---|---|
| $C_1$ | -1 -1 -1 -1 1 1 1 1 | $b_1$ | 0 0 |
| $C_2$ | 1 -1 -1 1 -1 1 1 -1 | $b_2$ | 0 1 |
| $C_3$ | -1 1 1 -1 -1 1 -1 1 | $b_3$ | 1 0 |
| $C_4$ | 1 1 1 1 -1 -1 -1 -1 | $b_4$ | 1 1 |

Figure 7

| | Data Bit Sequence or Symbol | | Channel Sequence |
|---|---|---|---|
| $b_1$ | 0000 | $\bar{c}_1$ | [-1 -1 -1 -1 -1 -1 -1 -1 1 1 1 1 1 1 1 1] |
| $b_2$ | 0001 | $\bar{c}_2$ | [-1 -1 -1 -1 1 1 1 1 1 1 1 1 -1 -1 -1 -1] |
| $b_3$ | 0010 | $\bar{c}_3$ | [-1 -1 -1 -1 1 1 1 1 -1 -1 -1 -1 1 1 1 1] |
| $b_4$ | 0011 | $\bar{c}_4$ | [-1 -1 1 1 1 1 -1 -1 -1 1 1 1 1 -1 -1] |
| $b_5$ | 0100 | $\bar{c}_5$ | [-1 -1 1 1 1 1 -1 -1 -1 -1 1 1 -1 -1 1 1] |
| $b_6$ | 0101 | $\bar{c}_6$ | [-1 -1 1 1 -1 -1 1 1 1 1 -1 -1 1 1 -1 -1] |
| $b_7$ | 0110 | $\bar{c}_7$ | [-1 1 1 -1 1 -1 -1 1 1 -1 -1 1 -1 1 1 -1] |
| $b_8$ | 0111 | $\bar{c}_8$ | [-1 1 1 -1 1 -1 -1 1 -1 1 1 -1 1 -1 -1 1] |
| $b_9$ | 1000 | $\bar{c}_9$ | [1 -1 1 -1 1 -1 1 -1 1 -1 1 -1 1 -1 1 -1] |
| $b_{10}$ | 1001 | $\bar{c}_{10}$ | [1 1 -1 -1 -1 -1 1 1 -1 -1 1 1 1 1 -1 -1] |
| $b_{11}$ | 1010 | $\bar{c}_{11}$ | [1 1 -1 -1 -1 -1 1 1 1 1 -1 -1 -1 -1 1 1] |
| $b_{12}$ | 1011 | $\bar{c}_{12}$ | [1 1 -1 -1 1 1 -1 -1 -1 -1 1 1 -1 -1 1 1] |
| $b_{13}$ | 1100 | $\bar{c}_{13}$ | [1 1 -1 -1 1 1 -1 -1 1 1 -1 -1 1 1 -1 -1] |
| $b_{14}$ | 1101 | $\bar{c}_{14}$ | [1 1 1 1 -1 -1 -1 -1 -1 -1 -1 -1 1 1 1 1] |
| $b_{15}$ | 1110 | $\bar{c}_{15}$ | [1 1 1 1 -1 -1 -1 -1 1 1 1 1 -1 -1 -1 -1] |
| $b_{16}$ | 1111 | $\bar{c}_{16}$ | [1 1 1 1 1 1 1 1 -1 -1 -1 -1 -1 -1 -1 -1] |

Figure 12

DETECTION OF SERVO DATA FOR A SERVO SYSTEM

FIELD OF THE INVENTION

The present invention relates generally to servo systems, and more particularly but not by limitation to symbol mapping and detection for servo systems.

BACKGROUND OF THE INVENTION

Data storage devices use servo data to position a head relative to a data storage medium for read or write operations. During operation, a servo demodulator receives a readback signal to detect servo data associated with each track to position the head and to make sure that the head is in the vicinity of the track center. The servo data includes, for example, Servo Address Mark (SAM), Servo Index Mark (SIM) and Track IDs associated with each data track. The SAM, SIM and Track IDs are detected using a symbol mapping and an associated detection algorithm. As the demand for greater storage density increases, prior symbol mapping and detection algorithms require more redundancy which reduces servo format efficiency. Aspects of the present invention provide solutions to these and other problems, and offer other advantages over the prior art.

SUMMARY OF THE INVENTION

The application discloses a servo system for detecting and demodulating servo data. In illustrated aspects, a demodulation circuit or portion includes a correlation component configured to output a correlation of a sequence of equalized channel samples $y_i$ with a sequence of correlator weights $w_i$ derived based on at least one mapped channel sequence. A decision component uses the correlation result to determine a data bit symbol. Other features and benefits that characterize aspects of the present invention will be apparent upon reading the following detailed description and review of the associated drawings.

BRIEF DESCRIPTION OF THE DRAWINGS

FIGS. 6-7 illustrate exemplary mapping sequences for data bit pairs or symbols.

FIG. 8-1 illustrates an exemplary correlator for the correlator component of FIG. 8.

FIG. 12 illustrates exemplary mapping sequences for multi-data bit symbols.

DETAILED DESCRIPTION OF ILLUSTRATIVE ASPECTS

Figure 1:
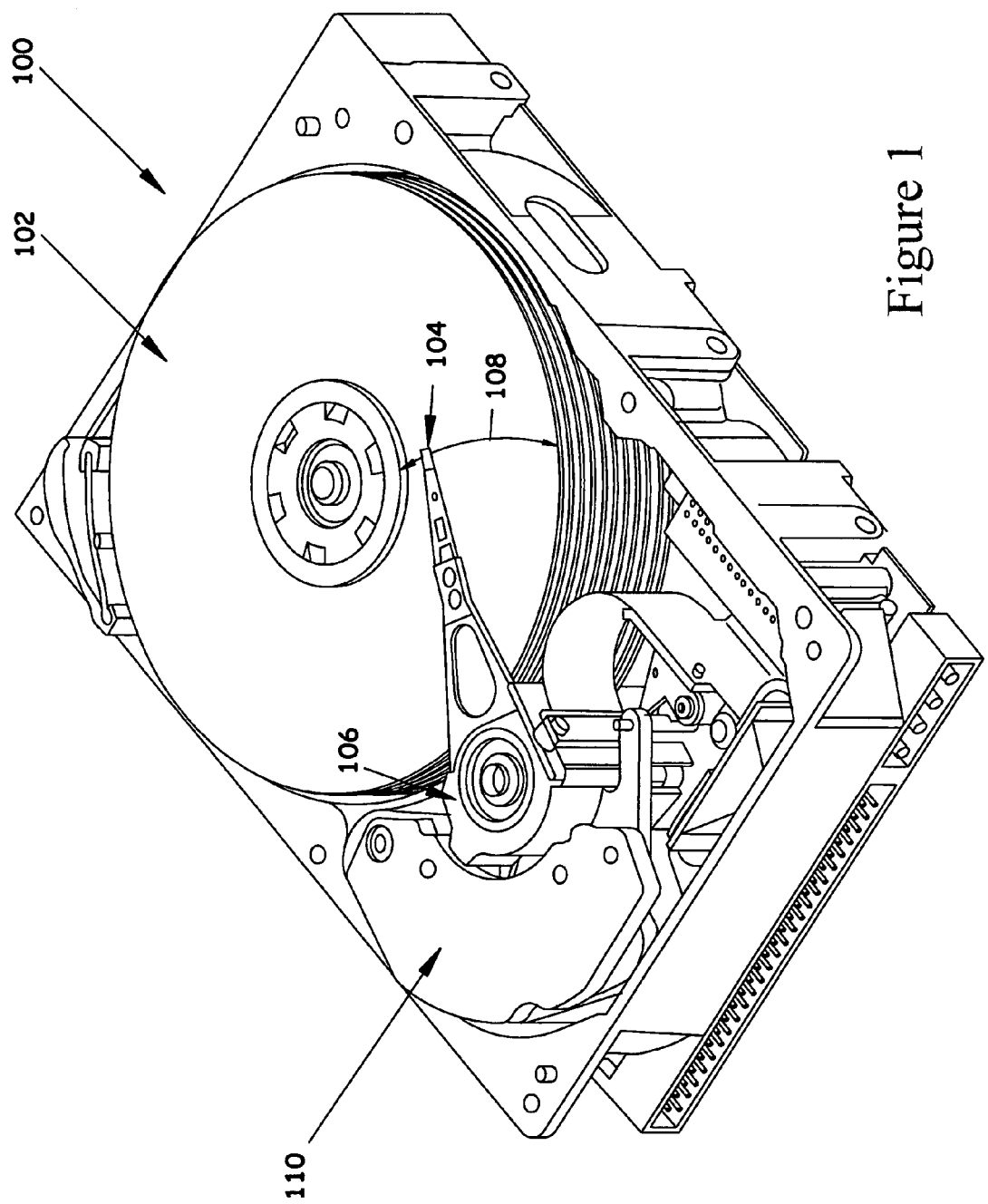
FIG. 1 is a perspective illustration of a data storage device in which aspects of the present invention can be used.

FIG. 1 illustrates a data storage device 100 in which aspects of the present invention are useful. The data storage device 100 shown includes a plurality of discs 102, however, application is not limited to the particular data storage device or plurality of discs shown. As shown, the data storage device 100 includes heads 104, which are coupled to an actuator 106 to read and/or write data from the plurality of discs or data storage medium. Heads 104 are moved and positioned relative to tracks on the disc as illustrated by arrow 108. The heads 104 are moved via operation of a voice coil motor 110 or other microactuator assembly (not shown). Voice coil motor 110 is driven based upon position signals derived from servo information or data on the disc or data storage medium as illustrated in FIG. 2.

Servo data is pre-encoded or written to discs 102 on a dedicated servo track or as embedded servo sectors. FIG. 2 illustrates an enlarged portion of a typical sector servo (e.g., embedded servo sector) on a disc 102. It will be understood by those skilled in the art that the portion illustrated in FIG. 2 is greatly enlarged so that the track portions appear to be in a straight lines, but are actually part of a circular tracks on the disc 102. In the aspect shown in FIG. 2, the servo data includes a PLL/AGC field 120, SIM/SAM field 122 and Track ID field 124. The SAM/SIM field 122 stores the data for Servo Address Mark (SAM) or the Servo Index Mark (SIM) for all cross track directions. The PLL/AGC field 120 includes a phase locked-loop PLL code.

Servo data is detected or read by the head 104 as the head rapidly moves in a cross-track direction. As the head moves, it first reads data sector 130 and then a space PADI 132. The head then begins reading the servo sector starting with the PLL/AGC field 120, SIM/SAM field and Track ID field 124. The data written in the PLL/AGS field 120 is the same all along the cross-track direction. Data in the SAM/SIM field 122 and Track ID fields 124 must be detected while the head is rapidly moving in a cross-track direction to provide a rapid seek mode of moving the head 104 from a previously used track to a next desired track.

Figure 2:
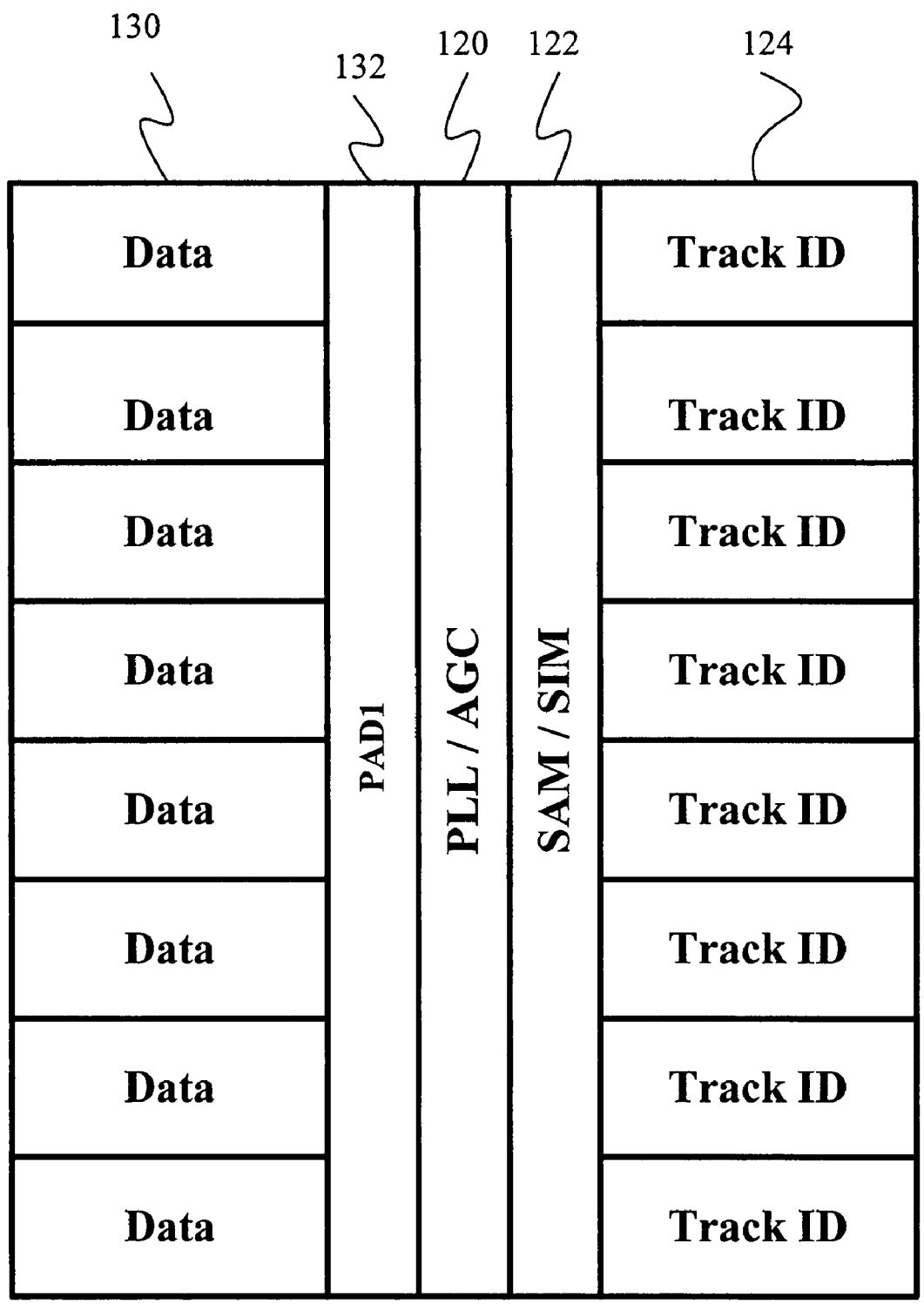
FIG. 2 is a schematic illustration of an exemplary arrangement of servo data fields.
Figure 3:
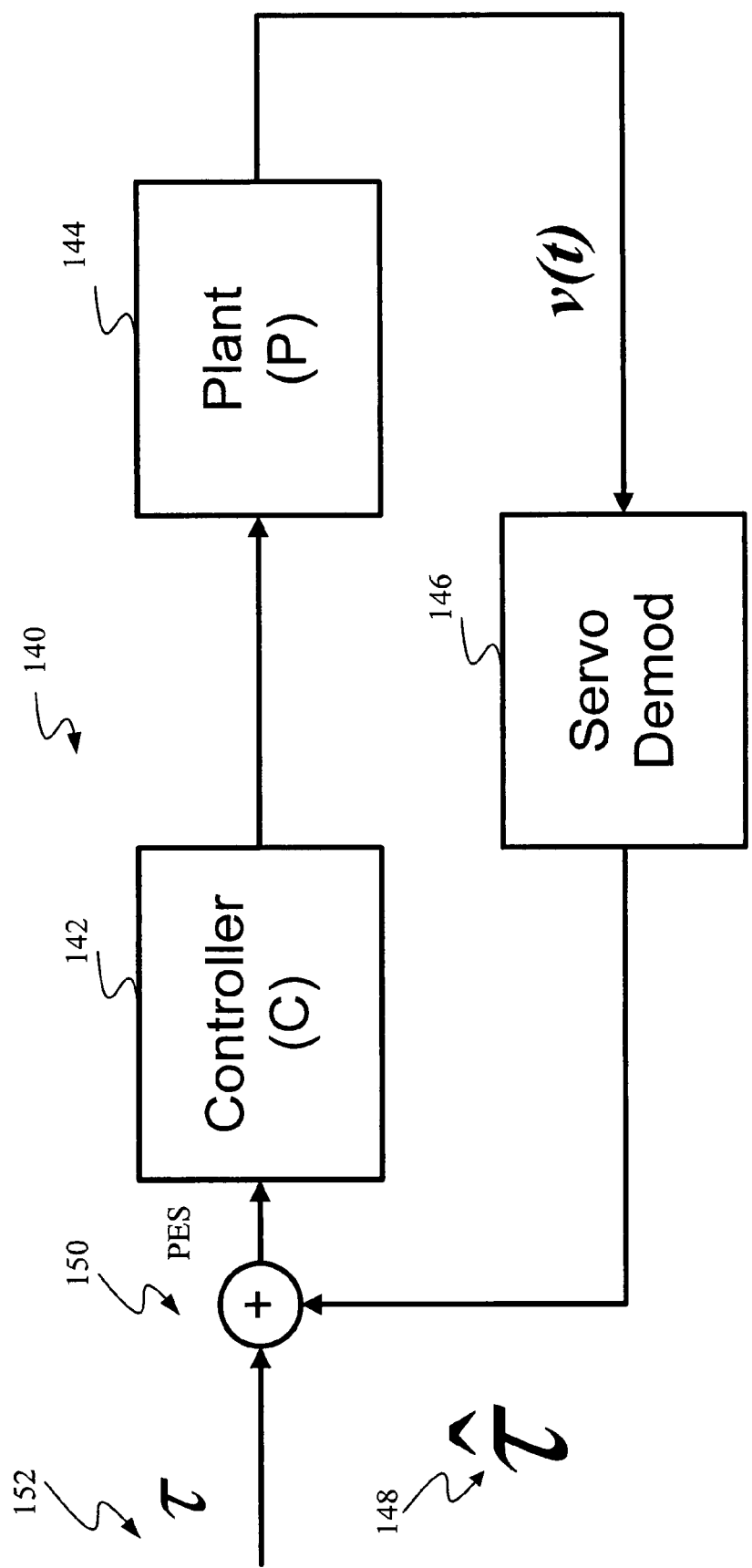
FIG. 3 is a schematic illustration of an exemplary servo control system or loop.

FIG. 3 illustrates an aspect of a servo system or control loop 140 that reads the servo data of FIG. 2 and uses the servo data to position the head 104. As shown, the control loop 140 includes a controller 142, plant 144 and servo demodulation component 146. The controller 142 provides a position signal to the actuator or plant 144 to move the head 104. The controller 142 typically comprises electronic circuitry that receives a position error signal (PES) that is a voice coil current or output to a microactuator (not shown). The plant 144 is a component such as voice coil motor that moves the head relative to the disc or storage medium and provides a readback signal v(t).

During operation, the head 104 reads the servo sectors on the disc to provide readback signal v(t) to the demodulation component 146. The readback signal v(t) is processed by the servo demodulation component 146 to detect servo data including the SAM, SIM and Track IDs associated with each track to make sure that the magnetic head is at the vicinity of the particular track center. As shown, the demodulation component 146 outputs a position estimation output $\hat{\tau}$ 148 provided by the readback signal v(t). A summing junction 150 receives a reference position output $\tau$ 152 and the position estimate output $\hat{\tau}$ 148 to provide an error output or position error signal (PES) based upon a difference between reference position $\tau$ and the position estimation $\hat{\tau}$. The reference position output $\tau$ 152 represents a desired head position relative to a center of a track that is being read.

Figure 4:
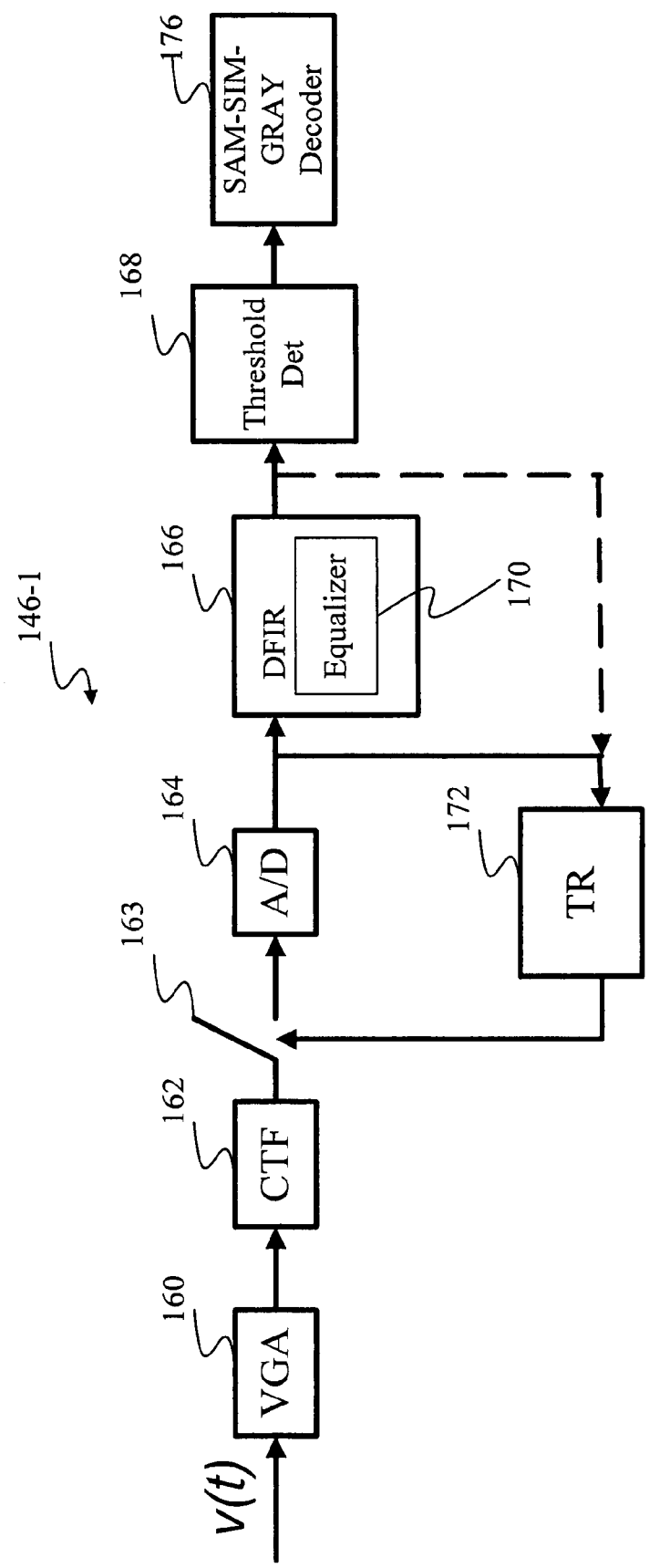
FIG. 4 is a schematic illustration of an exemplary demodulation circuit portion for detecting servo data.

FIG. 4 is an illustration of an aspect of a portion of the demodulation component 146 for detecting SAM/SIM and Track ID. In the aspect shown, the demodulation component 146-1 includes a variable gain amplifier 160, a continuous time filter (CTF) 162, a sampling switch 163, an analog-to-digital converter (A/D) 164, a digital finite impulse response (DFIR) circuit 166 and a threshold detector 168. An equalizer 170 in the DFIR 166 provides updated outputs every clock cycle T, but filtering in the DFIR 166 waits for 4T and gets 4 samples to output every 4 clock cycles. The equalizer 170 is referred to as a "4T equalizer" since it is optimized for a subsequent filter which waits for 4 samples before providing output. A timing recovery (TR) circuit 172 senses an A/D output (or, alternatively, a DFIR output) to recover the phase and frequency offset from the readback signal v(t) to control sampling at the sampling switch 163 at the correct sampling instances.

In the illustrated aspect one sample output is provided every 4T to the threshold detector 168. The threshold detected output is decoded to detect the servo information which as shown includes SIM/SAM. The SAM/SIM data is decoded via a SAM/GRAY decoder 176. The SAM/GRAY decoder 176 then detects the gray-coded Track ID 124 using gray coded information. Once the Track ID 124 of the next desired track is correctly detected, the head 104 is presumed to be in the vicinity of the center line of the desired track.

Figure 5:
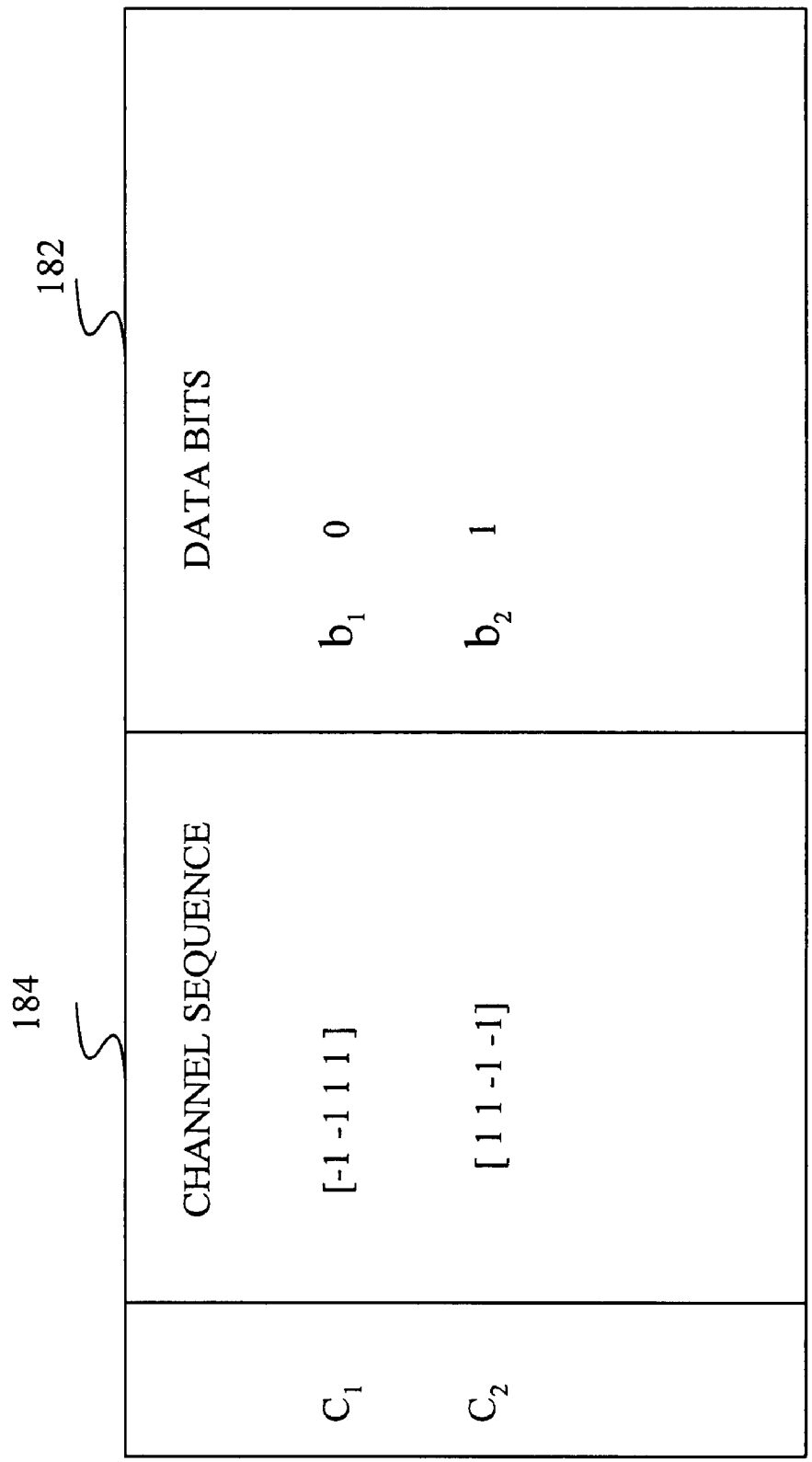
FIG. 5 illustrates an exemplary mapping sequence for data bits.

FIG. 5 illustrates an aspect of a symbol mapping methodology for mapping data bits $\bar{b}$ 182 to a channel sequence $\bar{c}$ 184. For the illustrated mapping methodology, servo data is encoded to provide a readback channel response or sequence $\bar{c}_1=[-1\ -1\ 1\ 1]$ or $\bar{c}2=[1\ 1\ -1\ -1]$. The channel sequence $\bar{c}_1=[-1\ -1\ 1\ 1]$ is decoded to bit value (0) and the channel sequence $\bar{c}_2=[1\ 1\ -1\ -1]$ is decoded to bit value (1). The symbol mapping methodology of FIG. 5 is used to detect data bits of the multi-bit SIM and SAM codes from the readback signal v(t). In an illustrative example, data bits of multi-bit code for SAM=100101 and SIM=111011 map to channel sequences $c_1=[-1\ -1\ 1\ 1]$ and $\bar{c}_2=[1\ 1\ -1\ -1]$. As shown, the multi-bit codes for SAM and SIM are selected to provide a Hamming distance of at least four (4) between the SAM and SIM so that the SAM and SIM are distinguishable.

FIGS. 6-7 illustrate symbol mapping methodologies using multiple data bit pairs which provides separation for distinguishing servo data and servo data fields. As shown, the methodology maps channel sequences $\bar{c}_1$-$\bar{c}_4$ 190 having an 8 sample length to multi-data bit pairs or symbols $\bar{b}_1$-$\bar{b}_4$ 192. As shown $\bar{c}_1=-\bar{c}_4$ and $\bar{c}_2=-\bar{c}_3$. All $\bar{c}_i$ are orthogonal with a 4T preamble sequence and the minimum Hamming distance between the channel sequences $\bar{c}_i$ and the preamble pattern is four (4). In the mapping sequence of FIG. 6, the frequency content of $\bar{c}_1$ and $\bar{c}_4$ is lower than that of $\bar{c}_2$ and $\bar{c}_3$.

Detection of the intersection of the PLL field 120 and SIM/SAM field 122 is important for servo response. To detect transition between the PLL field 120 and SIM/SAM field 122, an additional three zeros are added to the SIM and SAM codes to increase separation of the data stream for the encoded SIM/SAM (e.g. for the above example SIM=0001111001 and SAM=000100111) and PLL field 120. Inclusion of the additional data bits to the SIM/SAM field or data sequence increases storage and space requirements for the servo data. In the aspect shown in FIG. 6, data bits 194 of the PLL field 120 are designed to provide a channel response or sequence 196 that has a Hamming distance of at least four (4) relative to channel sequences $\hat{c}_1$-$\bar{c}_4$. In particular for the SIM/SAM having data bit pairs 01, 10, and 11, the Hamming distance between the mapped channel sequence $[-1\ -1\ 1\ 1\ 1\ -1\ -1]$ of data bit pair 01, mapped channel sequence $[1\ 1\ -1\ -1\ -1\ -1\ 1\ 1]$ of data bit pair 10 and mapped channel sequence $[1\ 1\ 1\ 1\ -1\ -1\ -1\ -1]$ for data bit pair 11 has a Hamming distance of at least four (4) from the channel sequence $\bar{c}_{PLL}=1\ 1\ -1\ -1\ 1\ 1\ -1\ -1$ (or at least 12 for the three data bit pairs 01, 10, 11) for the PLL bit pair 194 so that the transition between the PLL field 120 and the SIM/SAM field 122 is distinguishable without leading zeros.

Figure 8:
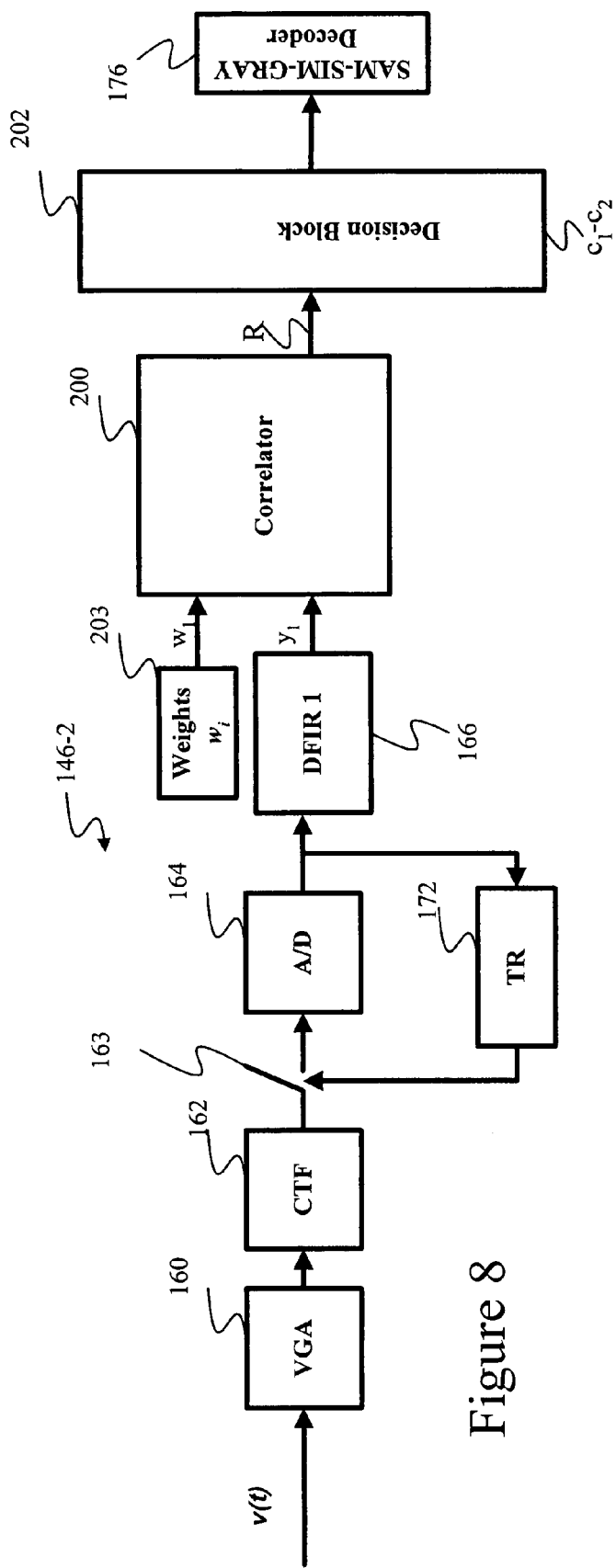
FIG. 8 is a schematic illustration of an exemplary demodulation circuit or portion that correlates a sequence of equalized channel samples with a sequence of correlator weights according to aspects described below.
Figures 1, 8:
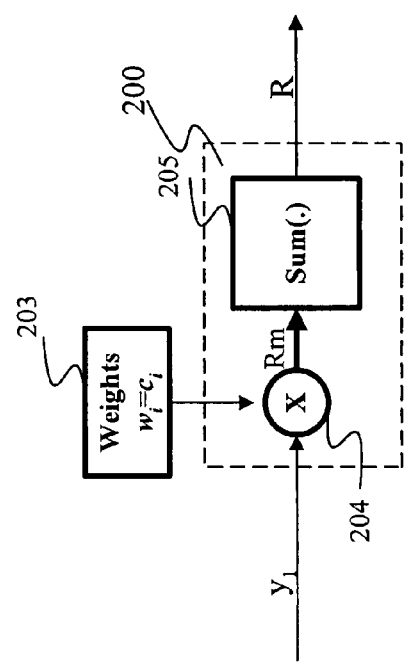

FIG. 8 illustrates an aspect of a portion of the demodulation component 146-2 for detecting servo data for example, SIM/SAM and Track ID where like numbers are used to refer to like parts in the previous FIGS. In the illustrated aspect, the demodulation component 146-2 includes a correlator component 200 and a decision component 202. The correlation component 200 is configured to receive a sequence of equalized channel samples $y_i$ from the DFIR 166 and compute a correlation of the sequence of channel samples $y_i$ with a sequence of correlator weights $w_i$ as illustrated by block 203.

In an illustrated aspect, the sequence of correlator weights $w_i$ 203 is the mapped channel sequence $\bar{c}_1$ illustrated in FIG. 5. More generally, the correlator weight sequence may be any sequence of correlator weights $w_i$ derived based on the mapped channel sequence or sequences for the encoded data. For example, the sequence of correlator weights may be derived using methods which seek to optimize symbol detection performance using knowledge of signal shape, noise, distortion and nonlinearity characteristics or other optimization factors that will be appreciated by those skilled in the art.

Output results R from the correlator component 200 are provided to the decision block or component 202. In the illustrated aspect, the decision component 202 is a threshold detector which receives the correlation results and outputs a data bit symbol corresponding to the mapped channel sequence having the maximum correlation to the sequence of channel samples.

The aspect shown in FIG. 8 illustrates an application for processing a readback signal v(t) for the symbol mapping methodology of FIG. 5. In an illustrative aspect as shown, output from the DFIR1 166 is correlated with the mapped channel sequence $\bar{c}_1=[-1\ -1\ 1\ 1]$. Since $\bar{c}_1=-\bar{c}_2$, correlation to $\bar{c}_2$ can be detected based upon the sign of the correlation results. Output from the correlator component 200 is sent to the decision component 202 to determine the sign of the correlation of the equalized channel sequence of readback signal v(t) with $\bar{c}_1$. For example in the illustrated aspect, if input to the decision component 202 or threshold detector is positive, the decision component 202 outputs bit $\bar{b}_1=0$, otherwise, the decision component 202 outputs $\bar{b}_2=1$. Only $\bar{c}_1$ is orthogonal with a 4T preamble pattern and the Hamming distance between $\bar{c}_1$ and the preamble pattern is 4. However, $\bar{c}_2$ is identical with the preamble. For this reason, neither the SIM nor SAM should start with $\bar{b}_2$ and should have three consecutive $\bar{b}_1$ at their start. As described, the circuitry for implementing correlation already exists in the PES extraction data path of current read channels, and thus it may be feasible to implement the illustrated correlation with existing circuit components at minimal increase in overall complexity The CTF 162 in FIG. 8 is designed to pass all frequency contents specified in $\bar{c}_1$.

In an illustrated aspect shown in FIG. 8-1, the correlator component 200 includes a multiplier component 204 and a summation component 205. As shown, the multiplier component 204 receives a sequence of equalized channel samples $y_1, y_2, \ldots y_n$ and a sequence of correlator weights $w_1, w_2, w_n$ 203 and outputs a multipler result $R_m$. The summation component receives output $R_m$ of the mulitipler component 204 and outputs summation results R. The output summation results R are provided to the decision component 202 to output a data bit symbol as previously described.

Figure 9:
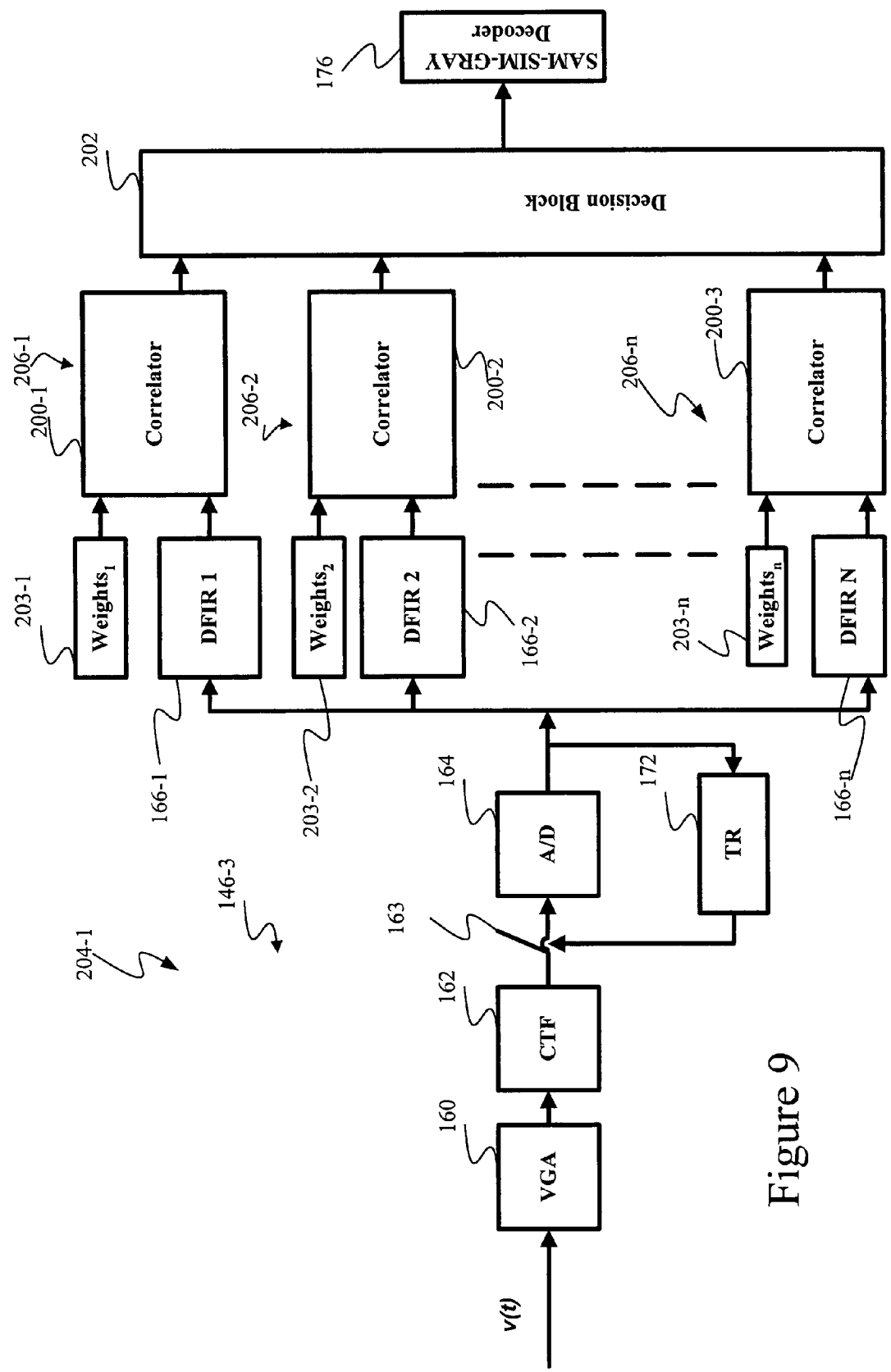
FIGS. 9-11 are schematic illustrations of exemplary demodulation circuits or portions including multiple branches to correlate a sequence of equalized channel samples with a plurality of sequences of correlator weights according to aspects described below.

FIG. 9 illustrates an aspect of a portion of the demodulation component 146-3 for detecting servo data. As shown, the demodulation component 146-3 includes a plurality of processing branches 206-1, 206-2, 206-n including DFIR1 166-1-DFIRN 166-n (where n refers the number) and correlator components 200-1, 200-2, 200-n. The correlator components 200-1, 200-2 and 200-n compute the correlation of the output from respective DFIR1 166-1-DFIRn 166-n with $c_i$ or other correlator weight sequence $w_i$ e.g. 203-1, 203-2, 203-n for each branch DFIR1-DFIRn. The results of the correlator components 200-1, 200-2, 200-n for each of the plurality of branches 206-1, 206-2, 206-n is outputted to the decision component 202 that identifies the mapped channel sequence $\bar{c}_1$-$\bar{c}_n$ having the maximum correlation to the sequence of equalized channel samples to output a data bit pair or symbol. The outputted data bit pair or symbol is transmitted to the decoder 176 to detect the servo data, e.g. SIM/SAM and Track ID. In FIG. 9, CTF 162 is designed to pass all frequency contents specified in $\bar{c}_1$-$\bar{c}_n$.

Figure 10:
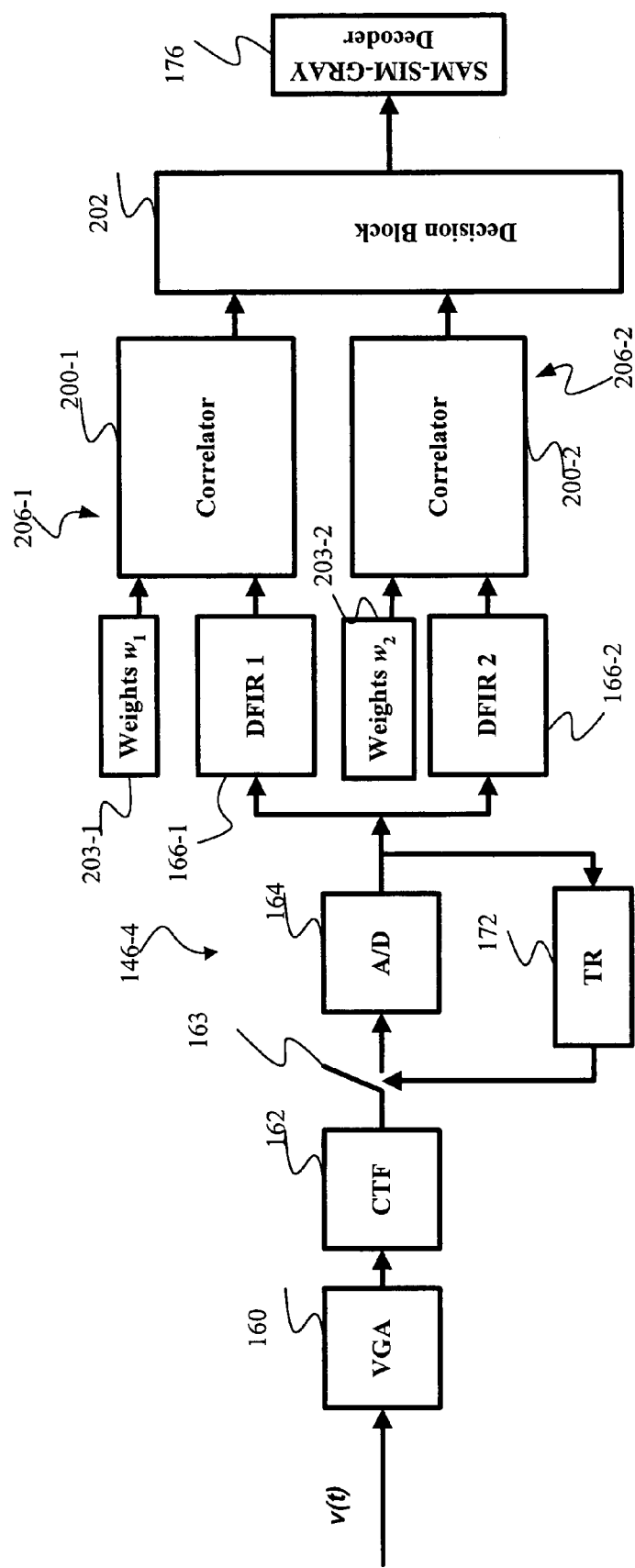

In current practice one data bit is mapped onto a symbol which is represented as 4 channel bits. As disclosed in illustrated aspects, data bit parts or multi-bit symbols for servo data are mapped to channel sequences having a length greater than 4T, where T is the length of one channel bit. FIG. 10 illustrates an aspect of a demodulation component 146-4 having a plurality of processing branches 206-1, 206-2 for processing a readback signal relative to mapping sequences $\bar{c}_1$-$\bar{c}_4$ having a length of eight, as illustrated in FIGS. 6-7. As shown a first process branch includes DFIR1 166-1 and a second branch includes DFIR2 166-2. Output from DFIR1 166-1 is correlated with a sequence of correlator weights $w_1$ 203-1 (which in an illustrative aspect is channel sequence $\bar{c}_1$) and output from DFIR2 166-2 is correlated with a sequence of weights $w_2$ 203-2 (which is an illustrative aspect is channel sequence $\bar{c}_2$). As shown in FIGS. 6-7, the encoded patterns $\bar{c}_1 = -\bar{c}_4$ and $\bar{c}_2 = -\bar{c}_3$ so that in the illustrated aspect, two correlation or processing branches 206-1, 206-2 are sufficient since the rest of the information can be extracted from the sign of the correlation results. For example if $\bar{c}$ is positive, it more likely corresponds to the encoded pattern [−1 −1 −1 −1 1 1 1 1] and if it is negative it corresponds to the encoded pattern [1 1 1 1 −1 −1 −1 −1].

As previously described the correlation for each branch is outputted to decision component 202 to determine the branch with the maximum correlation with the mapped channel sequence. Output from the decision component 202 is decoded at block 176 to detect SIM/SAM and Track ID as shown. The demodulation circuitry of FIG. 10 maximizes the Hamming distance between the symbols or bits and the 4T preamble pattern as compared to FIG. 8. This results in improvement in servo format efficiency, since leading zeros are not inserted before the SIM and SAM codes as previously described with respect to FIG. 6. This improvement however, compromises detection latency since 8 samples are used to detect a symbol or bit pair instead of 4.

Figure 11:
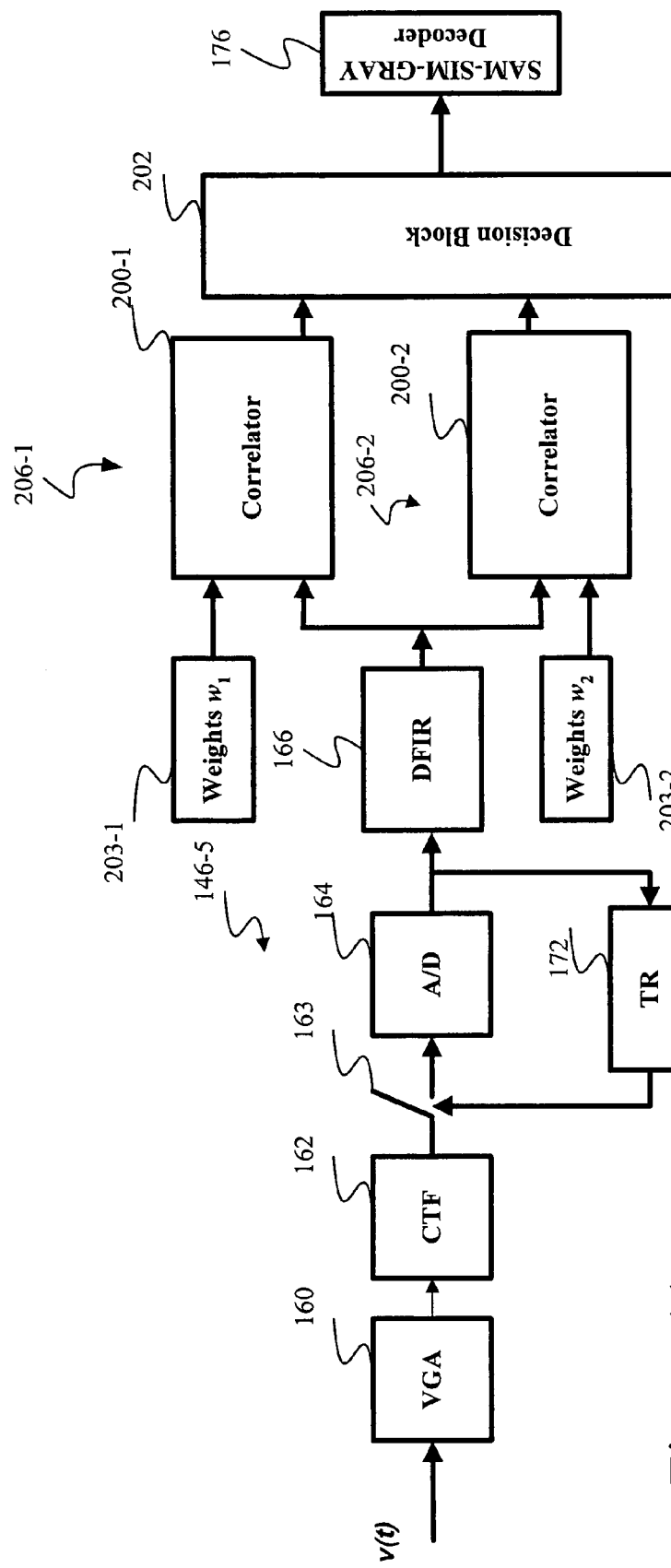

In the illustrated aspect of FIG. 10, each of the branches 206-1, 206-2 includes a DFIR 166-1, 166-2 for the mapped channel sequences $\bar{c}_1$ and $\bar{c}_2$ or sequence of correlator weights $w_1$ and $w_2$ for optimizing equalization performance for each branch. Alternatively in FIG. 11, the readback channel signal is processed by a single DFIR 166. Output from the DFIR 166 is provided to multiple branches 206-1, 206-2. As previously described, in branch 206-1, the sequence of channel samples $y_i$ is correlated with sequence of correlator weights $w_1$ (which is an illustrative aspect is mapped channel sequence $\bar{c}_1$) and in branch 206-2, the sequence of channel samples $y_i$ is correlated with sequence of correlator weights $w_2$ (which in an illustrative aspect is mapped channel sequence $\bar{c}_2$). Output from the correlator components 200-1, 200-2 for each branch 206-1, 206-2 is processed by the decision component 202 to determine the mapped channel sequence having the maximum correlation to the readback channel and output the data bit pair or symbol to detect the servo data. In FIGS. 10-11, the CTF 162 is designed to pass all the frequency contents specified by $\bar{c}_1$ and $\bar{c}_2$.

Figure 13:
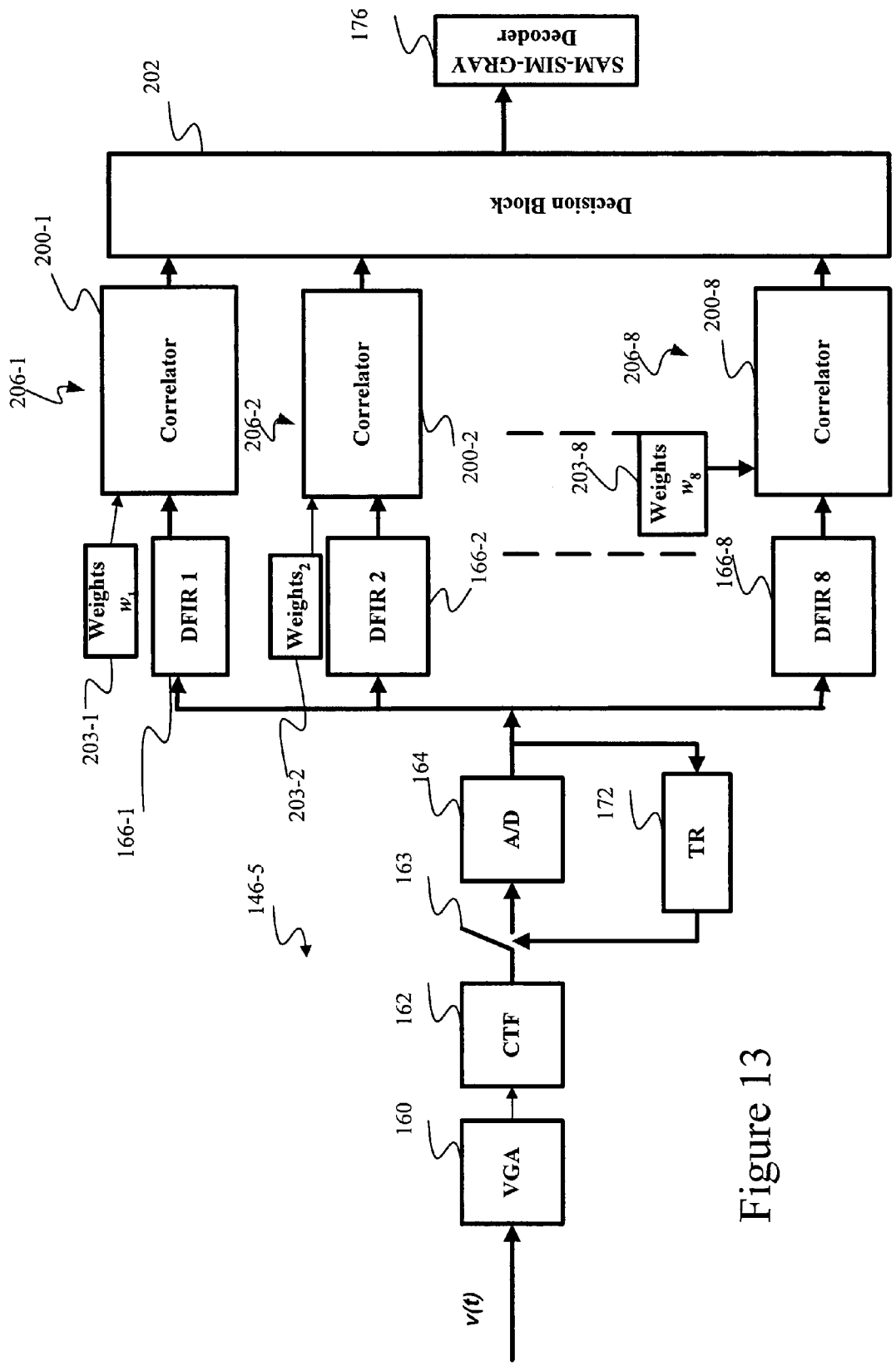
FIG. 13 is a schematic illustration of an exemplary demodulation circuit or portion including multiple processing branches to correlate a sequence of equalized channel samples with a plurality of sequences of correlator weights according to aspects described below.

FIG. 12 illustrates another multiple bit symbol mapping methodology where a 4 bit data sequence 190 is mapped to a channel sequence 192 having a length of 16. Servo data encoded using the symbol mapping methodology of FIG. 12 can be detected using the demodulation component 146-5 illustrated in FIG. 13. As shown, $\bar{c}_1$-$\bar{c}_8 = -\bar{c}_9$-$\bar{c}_{16}$ and thus an 8 branch configuration is sufficient to correlate the readback channel signal with the mapped channel sequences since the information for other channels can be extracted from the sign of the correlation results. For example, if the correlation of the DFIR output with $\bar{c}_1$ for example, is positive it is more likely for the transmitted symbol to be $\bar{b}_1 = [0000]$ and if it is negative, then it is more likely $\bar{b}_{16} = [1111]$. The general rule of finding the mapping is to form the Hadamard matrix with the desired size and pick the rows according to the frequency response of the channel. The additional process branches of FIG. 13 can increase format efficiency, and also can increase implementation cost and latency.

Figure 14:
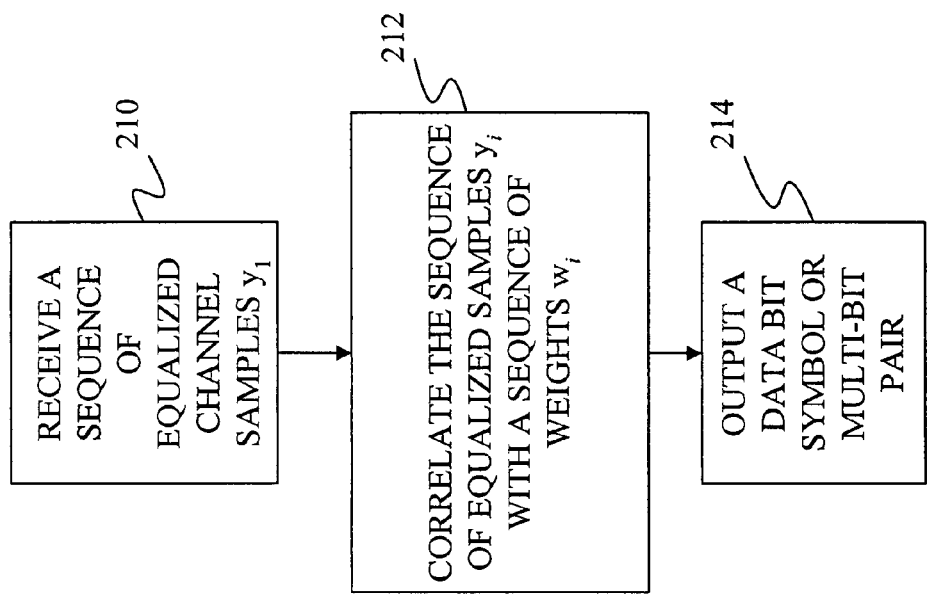
FIG. 14 is a flow chart illustrating steps for correlating a sequence of equalized channel samples with a sequence of correlator weights.

FIG. 14 is a flow chart illustrating the steps for correlating a readback signal with a sequence of correlator weights $w_i$. As shown in FIG. 14 in step 210, a sequence of equalized channel samples is received from the equalizer 170. In step 212, the sequence of equalized channel samples is correlated with the sequence of correlator weights $w_i$ (which in an illustrative aspect is at least one mapped channel sequence). As shown in step 214, the output of the correlation component 200 is used to detect the mapped channel sequence having a maximum correlation with the sequence of equalized channel samples to output a data bit or multi-data bit symbol.

Figure 15:
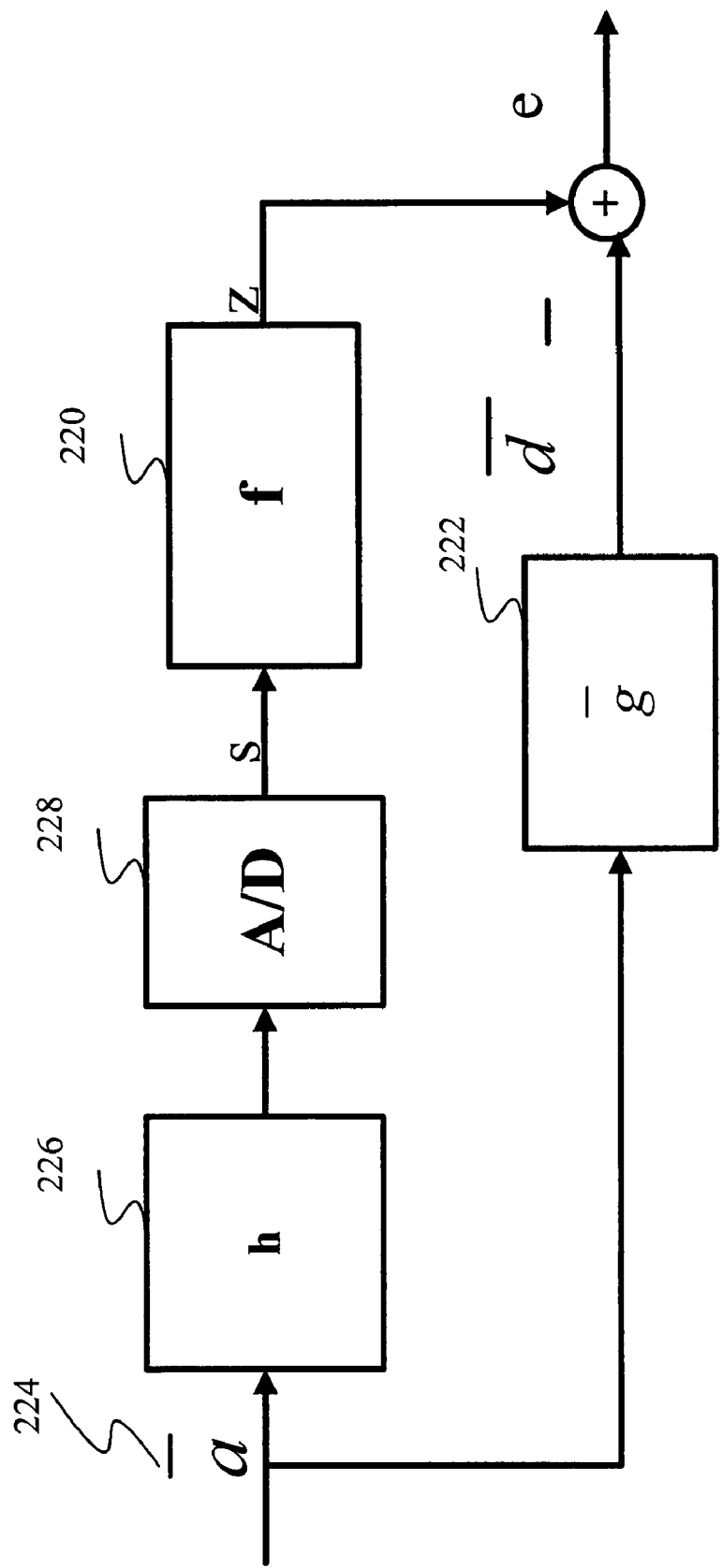
FIG. 15 is a schematic illustration of an architecture for determining equalizer coefficients analytically.

In the illustrated aspects, equalizers are 5-tap equalizers having the form [f1 f2 1 f2−f1]. FIG. 15 illustrates circuit architecture for designing equalizer response or tap constraints for DFIR 166 of the illustrated demodulation components or circuitry. As shown, the equalizer coefficients $\bar{f}$ 220 are derived based upon a target or ideal sequence or response $\bar{g}$ 222 and input channel sequence $\bar{\alpha}$ 224. As shown, the architecture includes block $\bar{h}$ 226 that represents the magnetic recording architecture that provides a readback signal that models a readback signal from a data storage device with noise and distortion, an A/D 228 and blocks f 220 and g 222 that represent the equalizer and target channel sequence.

In an illustrative aspect using the symbol mapping of FIG. 5, the target channel sequence is fixed to [a a −a −a], and the equalizer is in the form [f1 f2 1 f2 −f1]. The ideal channel output $\bar{d}$ in FIG. 15 is determined by convolving the input channel sequence $\bar{a}$ with the target sequence or response $\bar{g}$. The optimum values of f1 and f2 are determined within a range to minimize the mean square error of the difference between samples of ideal channel output $\bar{d}$ and an equalizer output $\bar{z}$.

As shown, the equalizer coefficients are determined analytically in contrast to brute force search algorithms. For this example, a cost function can be set to:

$$\sigma_e^2 = E[|\bar{e}|^2] - 2\bar{\lambda}_g^T(\hat{C}_g^T\bar{g} - \bar{\alpha}_g) - 2\bar{\lambda}_f^T(\hat{C}_f^T\bar{f} - \bar{\alpha}_f) \qquad \text{Equation 1}$$

where $\bar{e}$ is the error vector in FIG. 15, $\hat{C}_g$ and $\hat{C}_f$ are the constraint matrices which impose the desired constraints on target and equalizer responses respectively, and $\bar{\alpha}_g$ and $\bar{\alpha}_f$ store the values of the specified constraints. After some algebra, the following 4 sets of equations are obtained by taking the derivative of the cost function in Equation 1 with respect to the elements of the vectors $\bar{f}$, $\bar{g}$, $\bar{\lambda}_f$, $\bar{\lambda}_g$:

$$\hat{R}^{ss}\bar{f} = \hat{R}^{s\alpha}\bar{g} + \bar{\lambda}_f^T \hat{C}_f^T, \qquad \text{Equation 2}$$

$$\hat{R}^{\alpha\alpha}\bar{g} = \hat{R}^{\alpha s}\bar{f} + \bar{\lambda}_g^T \hat{C}_g^T, \qquad \text{Equation 3}$$

$$\hat{C}_f^T\bar{f} = \bar{\alpha}_f, \qquad \text{Equation 4}$$

$$\hat{C}_g^T\bar{g} = \bar{\alpha}_g, \qquad \text{Equation 5}$$

where $$\hat{R}^{ss} = E\{\hat{S}^T\hat{S}\}$$
$$\hat{R}^{\alpha\alpha} = E\{\hat{A}^T\hat{A}\}$$
$$\hat{R}^{s\alpha} = E\{\hat{S}^T\hat{A}\}$$
$$\hat{R}^{\alpha s} = E\{\hat{A}^T\hat{S}\} \qquad \text{Equation 6}$$

with matrices $$\hat{S} = \begin{pmatrix} \bar{s}(0) & 0 & 0 & \cdots & 0 \\ \bar{s}(1) & \bar{s}(0) & 0 & \cdots & 0 \\ \bar{s}(2) & \bar{s}(1) & \bar{s}(0) & \cdots & 0 \\ \vdots & \vdots & \vdots & \vdots & \vdots \\ \bar{s}(N-1) & \bar{s}(N-2) & \bar{s}(N-3) & \cdots & \bar{s}(0) \\ \vdots & \vdots & \vdots & \vdots & \vdots \\ \bar{s}(L-1) & \bar{s}(L-2) & \bar{s}(L-3) & \cdots & \bar{s}(L-N+1) \end{pmatrix} \qquad \text{Eq. 7}$$

and $$\hat{A} = \begin{pmatrix} \bar{a}(0) & 0 & 0 & \cdots & 0 \\ \bar{a}(1) & \bar{a}(0) & 0 & \cdots & 0 \\ \bar{a}(2) & \bar{a}(1) & \bar{a}(0) & \cdots & 0 \\ \vdots & \vdots & \vdots & \vdots & \vdots \\ \bar{a}(M-1) & \bar{a}(M-2) & \bar{a}(M-3) & \cdots & \bar{a}(0) \\ \vdots & \vdots & \vdots & \vdots & \vdots \\ \bar{a}(L-1) & \bar{a}(L-2) & \bar{a}(L-3) & \cdots & \bar{a}(L-M+1) \end{pmatrix} \qquad \text{Eq. 8}$$

composed with the elements of equalizer input $\bar{s}$ and channel input $\bar{\alpha}$. From Equation 4, $\hat{C}_f$ and $\bar{\alpha}_f$ are:

$$\hat{C}_f^T = \begin{pmatrix} 0 & 0 & 1 & 0 & 0 \\ 0 & 1 & 0 & -1 & 0 \\ 1 & 0 & 0 & 0 & 1 \end{pmatrix}, \qquad \text{Equation 9}$$

$$\bar{\alpha}_f = [1\,0\,0]^T$$

in order to make sure that the equalizer has the form [f1 f2 1 f2 −f1]. Similarly, choosing $\hat{C}_g$ and $\bar{\alpha}_g$ as $$\hat{C}_g^T = \begin{pmatrix} 1 & 0 & 0 & 0 \\ 0 & 1 & 0 & 0 \\ 0 & 0 & 1 & 0 \\ 0 & 0 & 0 & 1 \end{pmatrix}, \qquad \text{Equation 10}$$

$$\bar{\alpha}_g = [a\,a\,-a\,-a]^T$$

sets the target response to be [a a −a −a] from Equation 5. Using these values of $\hat{C}_g$, $\bar{\alpha}_g$, $\hat{C}_f$, and $\bar{\alpha}_f$, and defining the following new variables $$\hat{K}_f = \hat{R}^{ss} - \hat{R}^{s\alpha}(\hat{R}^{\alpha\alpha})^{-1}\hat{R}^{\alpha s}$$
$$\hat{K}_g = \hat{R}^{\alpha\alpha} - \hat{R}^{\alpha s}(\hat{R}^{ss})^{-1}\hat{R}^{s\alpha}$$
$$\hat{A} = \hat{C}_g^T \hat{K}_g^{-1} \hat{R}^{\alpha s}(\hat{R}^{ss})^{-1}\hat{C}_f$$
$$\hat{B} = \hat{C}_g^T \hat{K}_g^{-1} \hat{C}_g$$
$$\hat{C} = \hat{C}_f^T \hat{K}_f^{-1} \hat{R}^{s\alpha}(\hat{R}^{\alpha\alpha})^{-1}\hat{C}_g$$
$$\hat{D} = \hat{C}_f^T \hat{K}_f^{-1} \hat{C}_f \qquad \text{Equation 11}$$

the expressions for $\bar{\lambda}_f$ and $\bar{\lambda}_g$ can be written as $$\bar{\lambda}_f = (\hat{D} - \hat{C}\hat{B}^{-1}\hat{A})^{-1}(\bar{\alpha}_f - \hat{C}\hat{B}^{-1}\bar{\alpha}_g) \qquad \text{Equation 12}$$

$$\bar{\lambda}_g = \hat{B}^{-1}(\bar{\alpha}_g - \hat{A}\bar{\lambda}_f) \qquad \text{Equation 13}$$

Finally, the analytical expression for the optimum equalizer $\bar{f}$ which minimizes the cost function in Equation 1 can be written as:

$$\bar{f} = \hat{K}_f^{-1}\hat{R}^{s\alpha}(\hat{R}^{\alpha\alpha})^{-1}\hat{C}_g\bar{\lambda}_g + \hat{K}_f^{-1}\hat{C}_f\bar{\lambda}_f. \qquad \text{Equation 14}$$

In illustrative aspects, the tap constraints can be determined analytically during a simulation process or can be determined "on-line" to correct for operating parameter changes.

Figure 16:
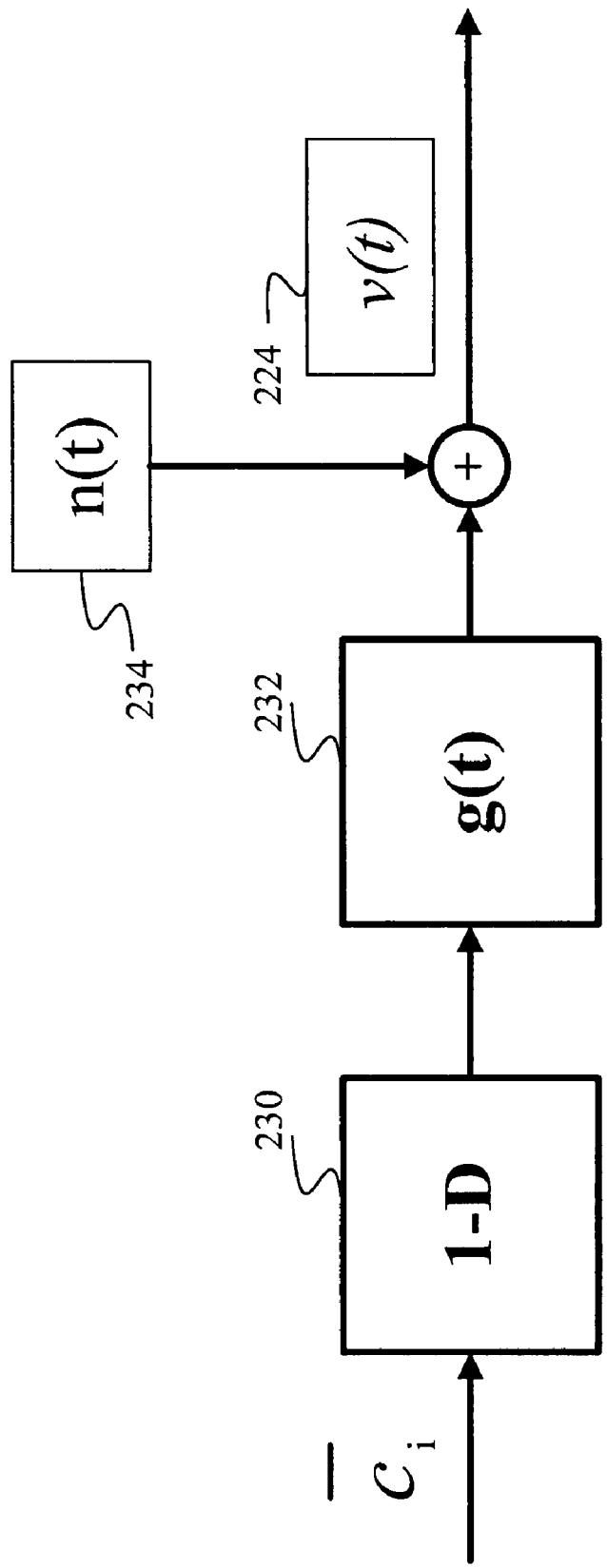
FIG. 16 illustrates components for generating input channel signals for test simulation of the demodulation circuits or portions of FIGS. 8-11 and 13.

FIG. 16 illustrates an aspect for generating a simulated readback signal v(t) 224 for collecting simulation data for testing the different demodulation architectures illustrated in FIGS. 8-11 and 13. As shown, the input signal v(t) is derived from channel sequences $\bar{c}_i$ which as illustrated in FIGS. 6-7 include $\bar{c}_1$-$\bar{c}_4$. The channel sequence goes through a differentiator (1-D) as illustrated by block 230 to obtain channel transitions, and the transitions are sent through a magnetic recording represented by channel transition response g(t) 232. In an illustrated aspect, the channel transition response g(t) is expressed by:

$$g(t) = erf\left(\sqrt{\frac{2t\sqrt{\ln 2}}{PW_{50}}}\right), \qquad \text{Equation 15}$$

where erf(.) is the error function which is defined by $$erf(x) = \frac{2}{\sqrt{\pi}} \int_o^x e^{-t^2}\,dt,$$

and $PW_{50}$ determines the width of the derivation of g(t) at half its maximum. The ratio $ND=PW_{50}/T$ represents the normalized recording density which defines how many data bits can be packed within the resolution unit PW50.

After convolving, the transition sequence with the transition response g(t), we add electronic noise n(t) as illustrated by block 234, represented as Additive White Guassian Noise (AWGN) to get the noisy readback or input signal v(t) 224.

The standard deviation σ of AWGN is found using the following expression $$\sigma = \sqrt{\frac{E_s}{10^{SNR_e/10}}} \quad \text{Equation 16}$$

$E_s$ is the energy of the impulse response (derivative of the transition response scaled by 2) of the recording channel and $SNR_e$ corresponds to the electronics noise Signal to Noise Ration (SNR) in the system. For convenience, we normalize the impulse response of the recording channel so that $E_s$ becomes unity.

Figure 17:
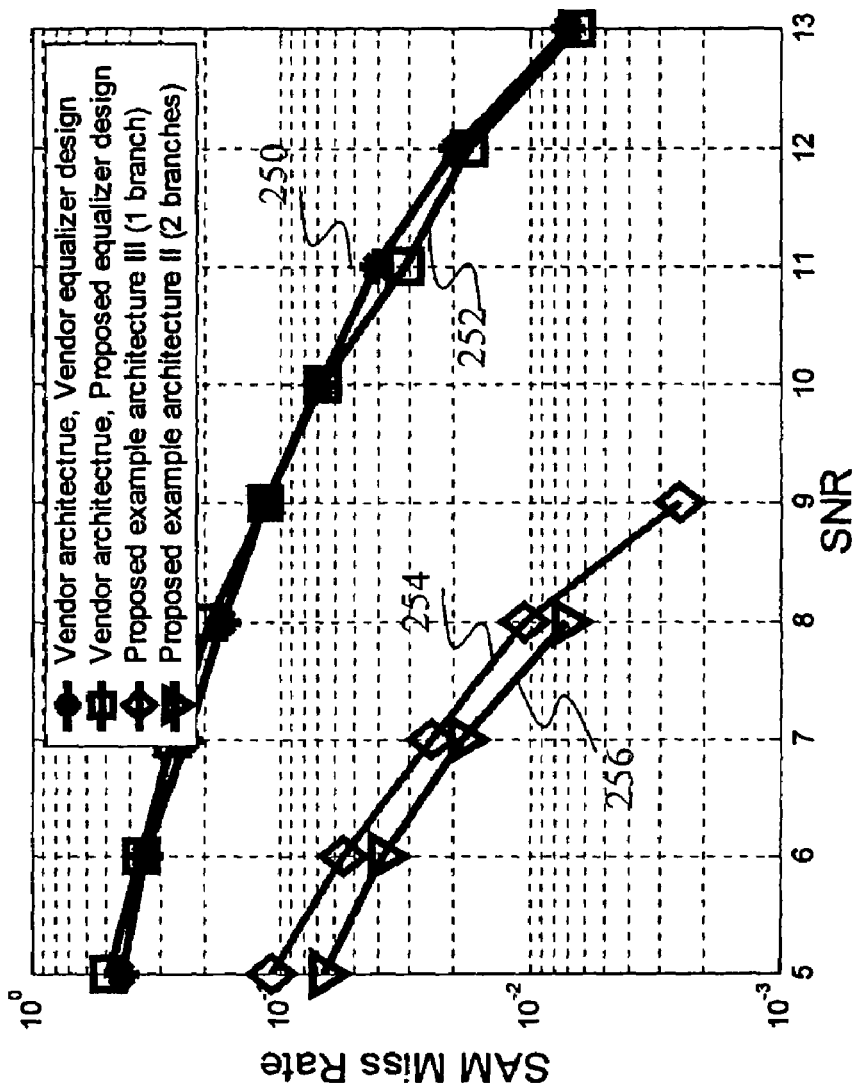
FIG. 17 graphically illustrates simulation results for different demodulation circuits and symbol mapping.
Figure 18:
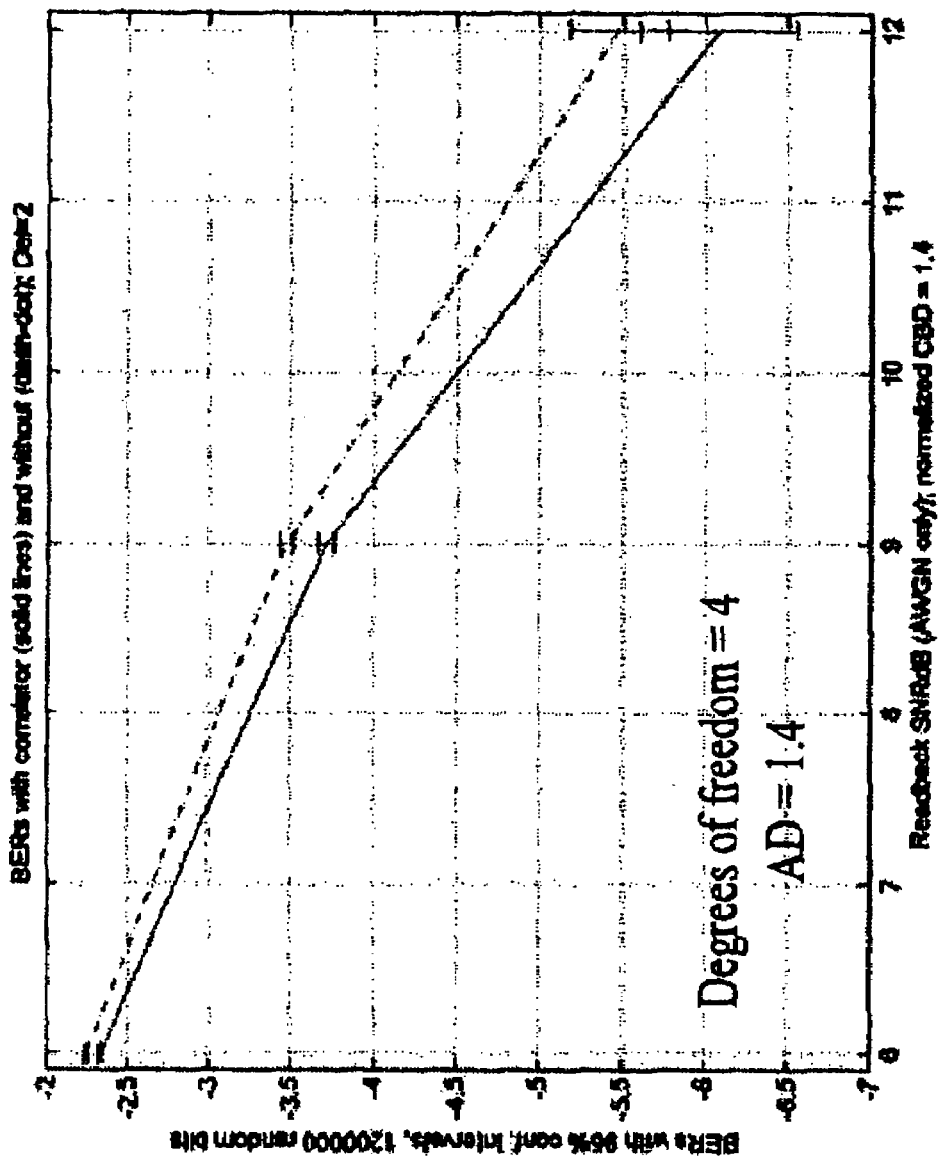
FIGS. 18-23 illustrate demodulation component performance at Areal Densities (AD)=1.4, 1.7 and 2.0 for FIGS. 8-11 and 13.
Figure 19:
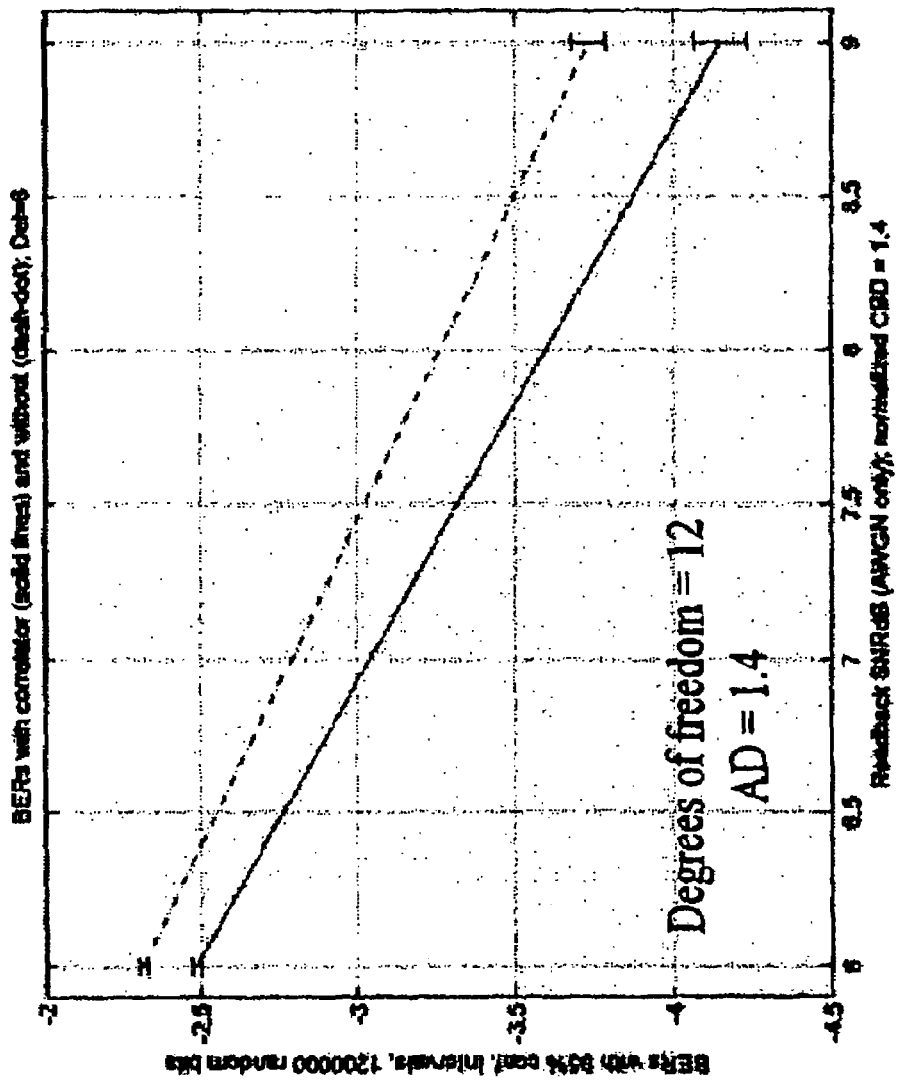
Figure 20:
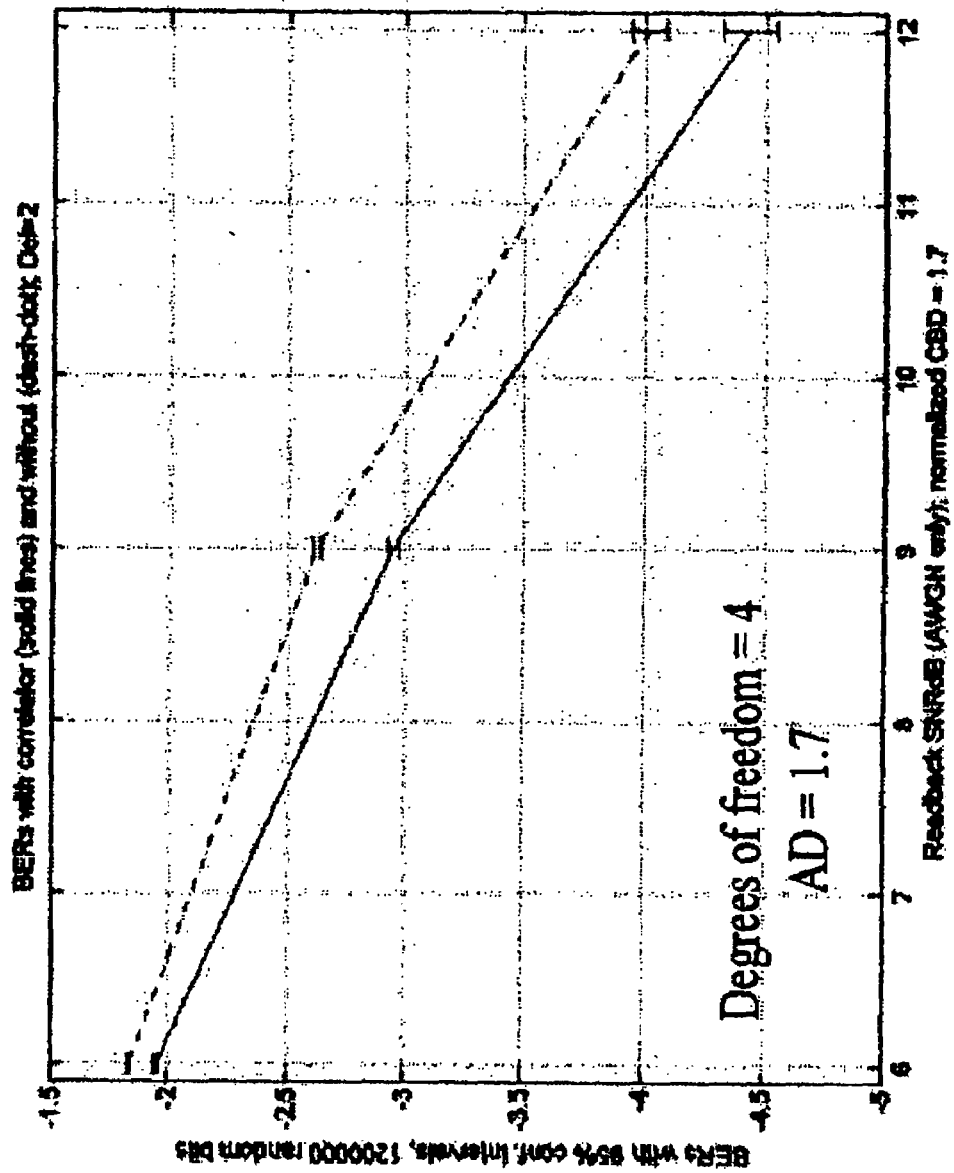
Figure 21:
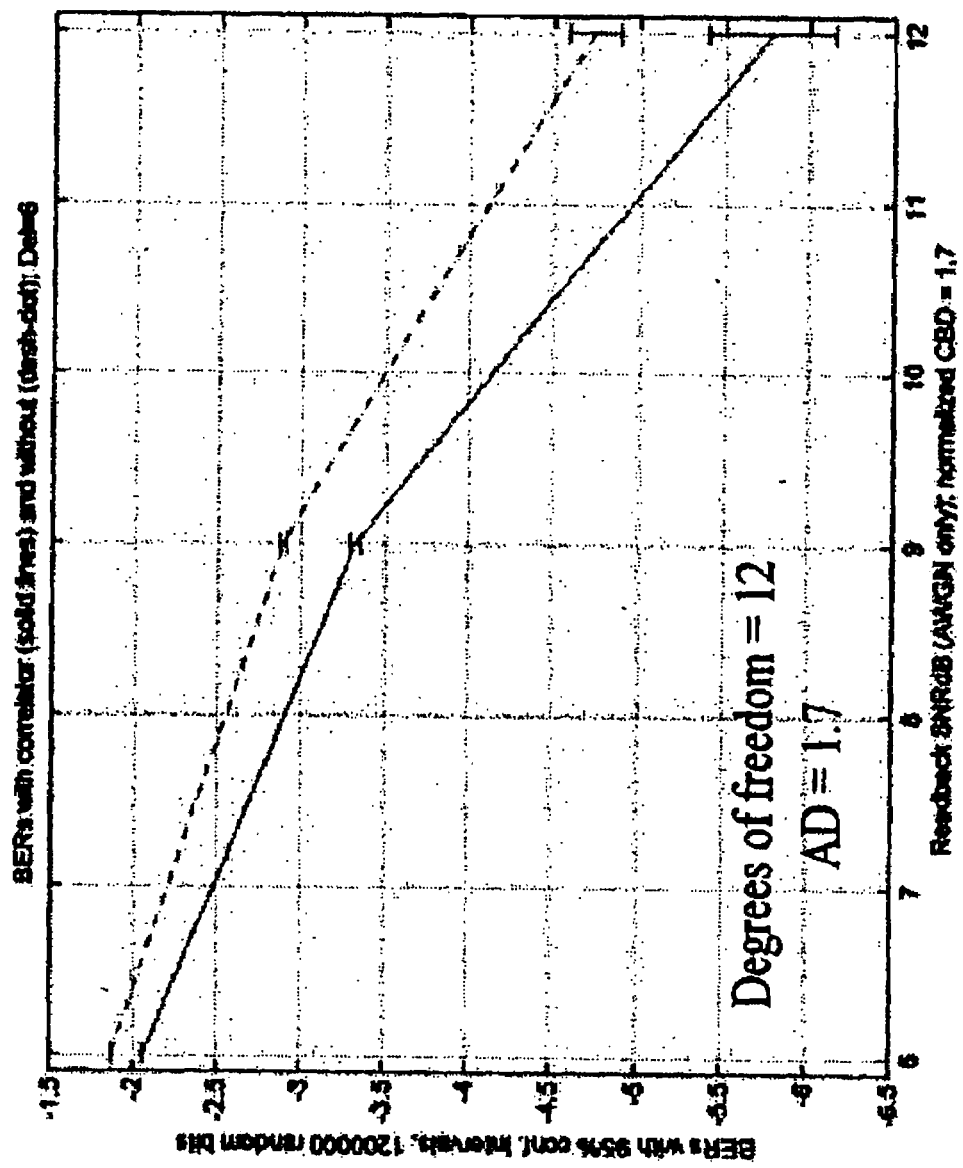
Figure 22:
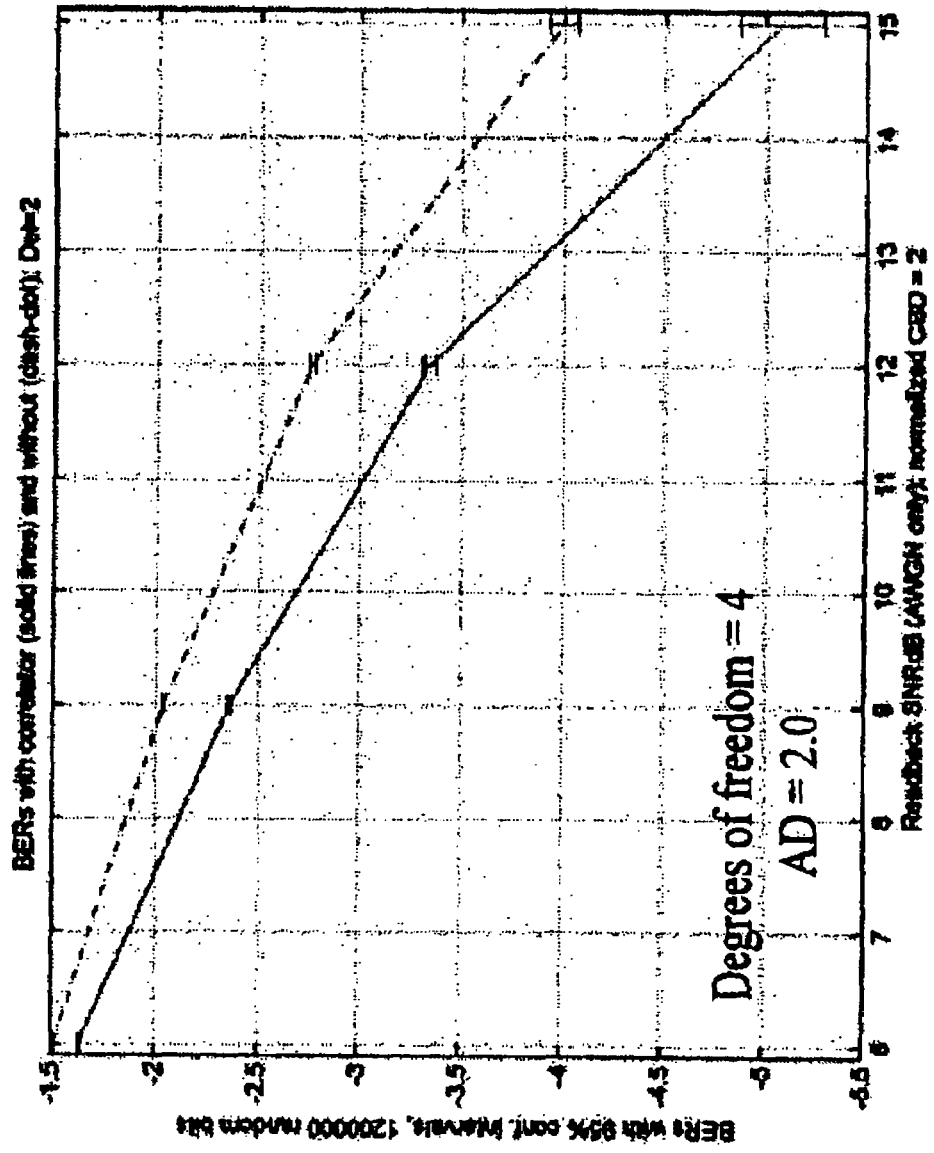
Figure 23:
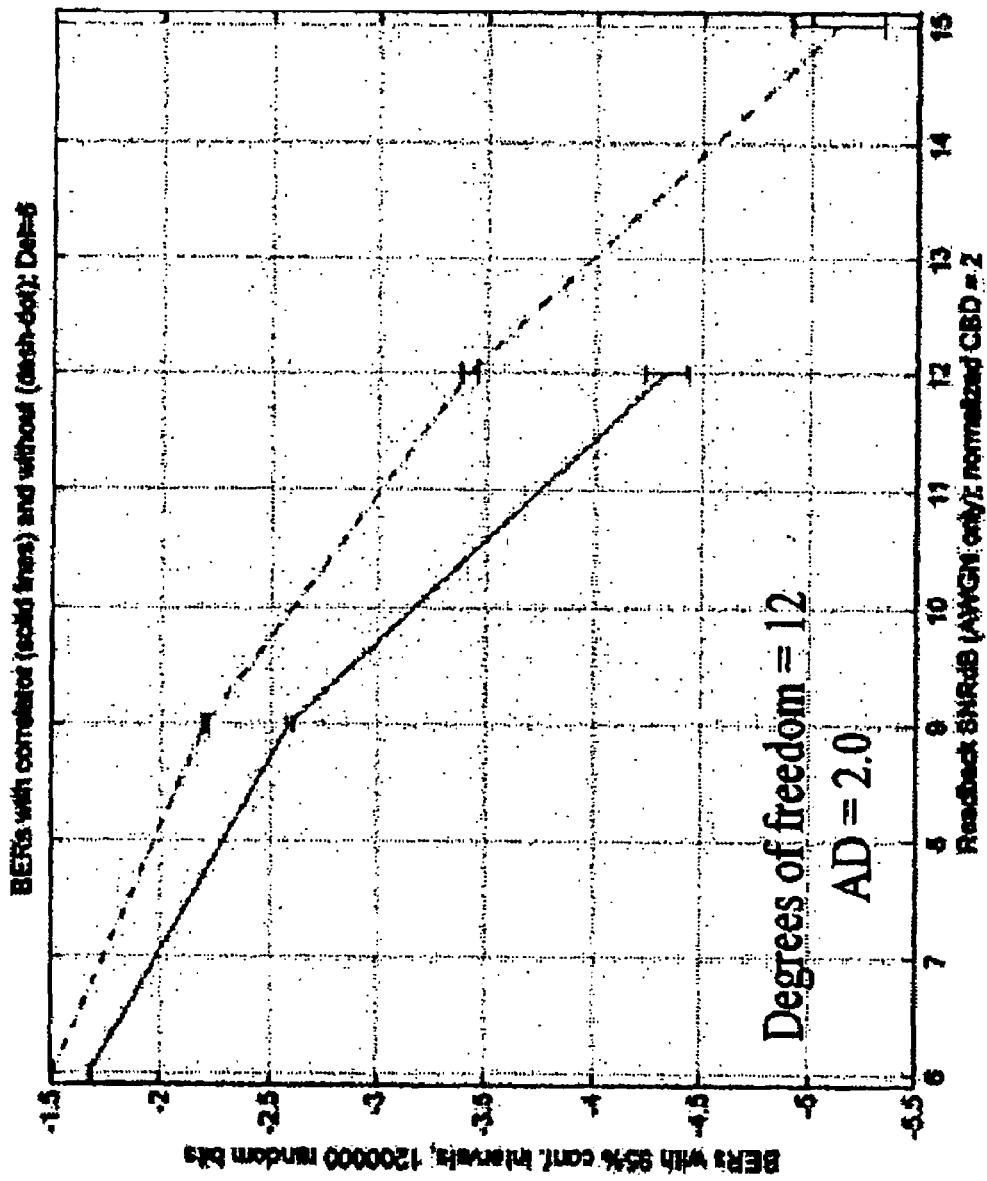

FIG. 17 illustrates plots comparing simulated missed SAM detection error rates for different demodulation circuitry. As shown, data sets 250, 252 correspond to prior demodulation designs of the type illustrated in FIG. 4 and data sets 254, 256 correspond to simulations of the designs of FIGS. 8 and 11, respectively. In data set 250, the equalizer tap coefficients are set by brute force search algorithms while in data set 252, the equalizer tap coefficients are set analytically. Data sets 254 and 256 have a lower miss rate than data sets 250, 252 for a fixed Signal to Noise Ratio (SNR). Data sets 254, 256 illustrate a comparison between a 9 bit SAM having leading zeros [000100101] and a shortened 6 bit SAM code [100101]. The codes are mapped to the respective channel sequence so that the 9 bit SAM is mapped to 36 channel bits (9 times 4) and the 6 bit SAM is mapped to 24 channel bits (6 times 4) which provides format efficiency over the 9 bit SAM code, however, at a greater latency rate.

FIGS. 18-23 illustrate the effect of correlation on the demodulation component performance at three different Areal Densities (AD) proportional to 1.4, 1.7, and 2.0 and at two different equalizer lengths (4 taps and 12 taps). The solid line corresponds to the demodulation component with correlation as illustrated in FIGS. 8-11 and 13.

Tables I and II below illustrate error performance for 10 traces for demodulation architectures with and without correlation for two different areal densities AD=1.4 and AD=2.0.

TABLE I

AD = 1.4

| | Trace Numbers | | | | | | | | | | |
|---|---|---|---|---|---|---|---|---|---|---|---|
| | 1 | 2 | 3 | 4 | 5 | 6 | 7 | 8 | 9 | 10 | 1-10 (total) |
| # of errors for FIG. 4 | 4 | 8 | 4 | 3 | 2 | 1 | 1 | 2 | 3 | 2 | 30 |
| # of errors with correlator of FIG. 8 | 2 | 1 | 7 | 1 | 3 | 1 | 1 | 2 | 2 | 2 | 22 |

TABLE II

AD = 2.0

| | Trace Numbers | | | | | | | | | | |
|---|---|---|---|---|---|---|---|---|---|---|---|
| | 1 | 2 | 3 | 4 | 5 | 6 | 7 | 8 | 9 | 10 | 1-10 (total) |
| # of errors for demodulation of FIG. 4 | 4 | 7 | 30 | 1 | 4 | 5 | 2 | 3 | 2 | 2 | 60 |
| # of errors with correlation of FIG. 8 | 2 | 1 | 7 | 1 | 3 | 1 | 1 | 2 | 2 | 2 | 22 |

As illustrated in Tables I and II, there is significant error improvement with correlation, particularly at higher areal densities.

It is to be understood that even though numerous characteristics and advantages of various aspects of the invention have been set forth in the foregoing description, together with details of the structure and function of various aspects of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application while maintaining substantially the same functionality without departing from the scope and spirit of the present invention. It will be appreciated by those skilled in the art that the aspects described herein can be used with known read heads including magnetoresistive, giant magnetoresistive (GMR), tunneling magnetoresistive (TMR) heads, and can also be used with moving heads in MRAM systems. In addition, although the preferred aspect described herein is directed to a servo sensing system for data tracks with concentric round geometries, it will be appreciated by those skilled in the art that the teachings of the present invention can be applied to data tracks or data patterns with other geometries that include servo data, without departing from the scope and spirit of the present invention.

What is claimed is:

1. An assembly for demodulating encoded data including a plurality of data bits or data bit pairs mapped to one or more channel sequences comprising:
    a correlator weight component configured to derive one or more sequence of correlator weights using the one or more mapped channel sequences;
    a correlator component configured to receive a sequence of equalized channel samples and compute a correlation of the sequence of equalized channel samples with the one or more sequence of correlator weights to generate a correlation result; and
    a decision component configured to receive the correlation result and generate data bit symbols based upon the correlation of the sequence of equalized channel samples to the one or more mapped channel sequences.

2. The assembly of claim 1 wherein the correlator component comprises a multiplier component that is configured to multiply the sequence of equalized channel samples by the one or more sequence of correlator weights and a summation component configured to sum an output from the multiplier component with the one or more sequence of correlator weights.

3. The assembly of claim 1 wherein the sequence of equalized channel samples comprises SIM/SAM data and/or Track ID.

4. The assembly of claim 1 and further comprising:
a DFIR filter including an equalizer which configured to receive a feedback channel input and output the sequence of equalized channel samples.

5. The assembly of claim 4 wherein the equalizer comprises an equalizer function $\bar{f}$ that is determined according to the formula:

$$\bar{f} = \hat{K}_f^{-1} \hat{R}^{s\alpha} (\hat{R}^{\alpha\alpha})^{-1} \hat{C}_g \bar{\lambda}_g + \hat{K}_f^{-1} \hat{C}_f \bar{\lambda}_f.$$

6. The assembly of claim 1 wherein the one or more mapped channel sequences includes $\bar{c}_1 = [1\ 1\ -1\ -1]$ or $\bar{c}_2 = [-1\ -1\ 1\ 1]$.

7. The assembly of claim 1 including a plurality of processing branches and each of the plurality of processing branches is configured to compute the correlation of the sequence of equalized channel samples with one of a plurality of sequences of correlator weights derived from one of a plurality of mapped channel sequences and output the correlation result for each of the plurality of processing branches to the decision component and the decision component is configured to determine a branch having a maximum correlation to output the data bit symbols.

8. The assembly of claim 7 wherein the plurality of processing branches includes a first processing branch having a first sequence of correlator weights derived based on one of the mapped channel sequences $\bar{c}_1 = [-1\ -1\ -1\ -1\ 1\ 1\ 1\ 1]$ or $\bar{c}_1 = [1\ 1\ 1\ -1\ -1\ -1\ -1]$ and a second processing branch having a second sequence of correlator weights derived based on one of the mapped channel sequences $\bar{c}_2 = [-1\ -1\ 1\ 1\ 1\ 1\ -1\ -1]$, $\bar{c}_2 = [1\ 1\ -1\ -1\ -1\ -1\ 1\ 1]$, $\bar{c}_2 = [1\ -1\ -1\ 1\ -1\ 1\ 1\ -1]$ or $\bar{c}_2 = [1\ 1\ 1\ -1\ 1\ -1\ -1\ 1]$.

9. The assembly of claim 7 wherein the plurality of processing branches include a plurality of equalizers and where the equalizer for each of the plurality of processing branches is derived based upon the mapped channel sequence of each particular processing branch.

10. The assembly of claim 9 wherein coefficients of the plurality of equalizers are determined analytically based upon the mapped channel sequences for each of the plurality of processing branches.

11. The assembly of claim 1 wherein the one or more sequence of correlator weights are the one or more mapped channel sequences.

12. An assembly comprising:
a data storage medium including servo data encoded on the data storage medium and the encoded servo data including a PLL field and a SIM/SAM field and/or Track ID and multi-data bits of the PLL field being mapped to an encoded channel sequence having a Hamming distance of at least four relative to mapped channel sequences of multiple-data bits of the SIM/SAM field and/or Track ID.

13. The assembly of claim 12 wherein the multiple-data bits of the SIM/SAM field and/or Track ID are mapped to a channel sequence having a length of at least eight samples.

14. The assembly of claim 12 wherein the multi-data bits $\bar{b}$ of the SIM/SAM field and/or Track ID are mapped to channel sequences $\bar{c}$ where
$\bar{b}_1 = [00]$ is mapped to $\bar{c}_1 = [-1\ -1\ -1\ -1\ 1\ 1\ 1\ 1]$ or $\bar{c}_1 = [1\ 1\ 1\ 1\ -1\ -1\ -1\ -1]$
$\bar{b}_2 = [01]$ is mapped to $\bar{c}_2 = [-1\ -1\ 1\ 1\ 1\ 1\ -1\ -1]$ or $\bar{c}_2 = [1\ -1\ -1\ 1\ -1\ 1\ 1\ -1]$
$\bar{b}_3 = [10]$ is mapped to $\bar{c}_3 = [1\ 1\ -1\ -1\ -1\ -1\ 1\ 1]$ or $\bar{c}_3 = [-1\ 1\ 1\ -1\ 1\ -1\ -1\ 1]$
$\bar{b}_4 = [11]$ is mapped to $\bar{c}_4 = [1\ 1\ 1\ 1\ -1\ -1\ -1\ -1]$ or $\bar{c}_4 = [1\ 1\ 1\ 1\ -1\ -1\ -1\ -1]$.

15. The assembly of claim 13 wherein the multiple data bits of the SIM/SAM field and/or Track ID are mapped to a channel sequence having a length of at least 16.

16. The assembly of claim 14 wherein the multi-data bits of the PLL field are mapped to the channel sequence $\bar{c} = [1\ 1\ -1\ -1\ 1\ 1\ -1\ -1]$.

17. A method comprising the steps of:
mapping a plurality of data bits or data bit pairs to a plurality of channel sequences;
deriving one or more correlator weights using one or more of the plurality of mapped channel sequences;
receiving a sequence of equalized channel samples;
computing a correlation of the sequence of equalized channel samples with the one or more sequence of correlator weights and generating a correlation result; and
processing the correlation result to generate data bit symbols.

18. The method of claim 17 and further comprising the steps of:
computing a plurality of correlation results for the sequence of equalized channel samples using a plurality of sequences of correlator weights for a plurality of processing branches;
determining a processing branch having a maximum correlation with at least one mapped channel sequence; and
generating the data bit symbol for the at least one mapped channel sequence for the processing branch having the maximum correlation.

19. The method of claim 17 wherein the plurality of mapped channel sequences have a length of at least 8 and are mapped to the plurality of data bit pairs.

20. The method of claim 19 and further comprising the steps of:
mapping $\bar{b}_1 = [00]$ to $\bar{c}_1 = [-1\ -1\ -1\ -1\ 1\ 1\ 1\ 1]$ or $\bar{c}_1 = [1\ 1\ 1\ 1\ -1\ -1\ -1\ -1]$
mapping $\bar{b}_2 = [01]$ to $\bar{c}_2 = [-1\ -1\ 1\ 1\ 1\ 1\ -1\ -1]$ or $\bar{c}_2 = [1\ -1\ -1\ 1\ -1\ 1\ 1\ -1]$
mapping $\bar{b}_3 = [10]$ to $\bar{c}_3 = [1\ 1\ -1\ -1\ -1\ -1\ 1\ 1]$ or $\bar{c}_3 = [-1\ 1\ 1\ -1\ 1\ -1\ -1\ 1]$; and
mapping $\bar{b}_4 = [11]$ to $\bar{c}_4 = [1\ 1\ 1\ 1\ -1\ -1\ -1\ -1]$ or $\bar{c}_4 = [1\ 1\ 1\ -1\ -1\ -1\ -1\ 1]$ where $b_1$-$b_4$ are the plurality of data bit symbols and $c_1$-$c_4$ are the plurality of mapped channel sequences.

* * * * *